(12) United States Patent
Beale et al.

(10) Patent No.: US 10,484,982 B2
(45) Date of Patent: Nov. 19, 2019

(54) REDUCTION OF CRC FIELD IN COMPACT DCI MESSAGE ON M-PDCCH FOR LOW COST MTC DEVICES

(71) Applicant: SONY CORPORATION, Tokyo (JP)

(72) Inventors: Martin Warwick Beale, Basingstoke (GB); Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 23 days.

(21) Appl. No.: 15/751,635

(22) PCT Filed: Sep. 8, 2016

(86) PCT No.: PCT/EP2016/071208
§ 371 (c)(1),
(2) Date: Feb. 9, 2018

(87) PCT Pub. No.: WO2017/050587
PCT Pub. Date: Mar. 30, 2017

(65) Prior Publication Data
US 2018/0242284 A1    Aug. 23, 2018

(30) Foreign Application Priority Data

Sep. 25, 2015   (EP) .................................... 15186986
Sep. 25, 2015   (EP) .................................... 15187000

(51) Int. Cl.
*H04W 72/04*   (2009.01)
*H04L 1/00*    (2006.01)
(Continued)

(52) U.S. Cl.
CPC ......... *H04W 72/042* (2013.01); *H04L 1/0061* (2013.01); *H04L 5/0053* (2013.01); *H04L 5/0094* (2013.01); *H04W 72/1289* (2013.01)

(58) Field of Classification Search
CPC ... H04L 1/0061; H04L 5/0053; H04L 5/0094; H04L 1/00; H04L 5/00; H04W 72/042; H04W 72/12
See application file for complete search history.

(56) References Cited

U.S. PATENT DOCUMENTS

2011/0194514 A1* 8/2011 Lee, II .................. H04L 1/0038
                                                          370/329
2013/0195041 A1* 8/2013 Papasakellariou .. H04W 72/042
                                                          370/329
(Continued)

FOREIGN PATENT DOCUMENTS

WO       2015/012032 A1    1/2015

OTHER PUBLICATIONS

Holma, et al., "LTE for UMTS OFDMA and SC-FDMA Based Radio Access", ISBN 978-0-470-99401-6, Wiley 2009, Total 4 pages.
(Continued)

*Primary Examiner* — Sithu Ko
*Assistant Examiner* — Nourali Mansoury
(74) *Attorney, Agent, or Firm* — Xsensus, LLP

(57) ABSTRACT

A terminal device, operable in a wireless telecommunications system, including: a receiver operable to receive a first control message from a base station indicating a radio resource for use by at least one of the receiver and a transmitter to exchange a signal with a base station, the first control message including a code generated based on an identifier of an intended terminal device and a value of a time-dependent parameter at a transmission time. The controller is operable to: attempt to perform a predetermined process using the code, an identifier of the terminal device, and the value of the time-dependant parameter; wherein: if the predetermined process is not successfully completed, disregard the first control message; if the predetermined (Continued)

process is successfully completed, control at least one of the receiver and transmitter to exchange a signal with the base station using the radio resource indicated by the first control message.

24 Claims, 6 Drawing Sheets

(51) Int. Cl.
*H04L 5/00* (2006.01)
*H04W 72/12* (2009.01)

(56) References Cited

U.S. PATENT DOCUMENTS

| 2013/0223366 | A1* | 8/2013 | Papasakellariou | H04W 72/042 370/329 |
|---|---|---|---|---|
| 2015/0181576 | A1* | 6/2015 | Papasakellariou | H04L 5/0053 370/329 |
| 2015/0257173 | A1* | 9/2015 | You | H04L 1/1864 370/330 |
| 2016/0173231 | A1 | 6/2016 | Yasukawa et al. | |

OTHER PUBLICATIONS

3GPP TS 36.213 V12.7.0, "3Generation Partnership Project; Technical Specification Group Radio Access Network; Evolved Universal Terrestrial Radio Access (E-UTRA); Physical layer procedures (Release 12)", (Sep. 2015), pp. 6-165.
Samsung, "M-PDCCH Design", 3GPP TSG RAN WG1 #82, R1-154095, Aug. 24-28, 2015, Total 5 pages.
International Search Report dated Nov. 17, 2016 in PCT/EP2016/071208 filed Sep. 8, 2016.
"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, vol. RAN WG1, No. V12.7.0, Sep. 22, 2015 (Sep. 22, 2015), pp. 1-136, XP050996213.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP Standard; 3GPP TS 36.300; vol. RAN WG2, No. V13.1.0, Sep. 23, 2015 (Sep. 23, 2015), pp. 1-254, XP050996156.
Communication pursuant to Article 94(3) EPC dated Jul. 5, 2019 in European Application No. 16 763 777.6.

* cited by examiner

Localised and distributed forms of ePDCCH

US 10,484,982 B2

REDUCTION OF CRC FIELD IN COMPACT DCI MESSAGE ON M-PDCCH FOR LOW COST MTC DEVICES

CROSS-REFERENCE TO RELATED APPLICATIONS

The present application claims priority to European Patent Application 15 186 986.4, filed in the European Patent Office on Sep. 25, 2015 and European Patent Application 15 187 000.3, filed in the European Patent Office on Sep. 25, 2015, the entire contents of each of which being incorporated herein by reference.

TECHNICAL FIELD OF THE DISCLOSURE

The present disclosure relates to a terminal device, base station, system and methods.

BACKGROUND OF THE DISCLOSURE

Mobile communications system (or wireless telecommunications system) such as those which are being developed in accordance with the Long Term Evolution (LTE) project by the Third Generation Project Partnership (3GPP) can provide a facility for communications devices to transmit or receive data for a variety of applications with high data rates within a radio coverage area provided by a mobile communications network. A wireless access interface provided by the mobile communications network configured in accordance with an LTE standard includes signal transmission techniques which can support these high data rates. There is therefore expected to be a variety of applications, which can be supported by an LTE system.

Although there are applications which require high data rates to support their operation, there are some applications in which high data rates are not required. Indeed there are some applications which are expected to be provided by more simple, less complicated communications devices such as those supporting machine type communications (MTC). Such devices are also expected to be low power devices and may include a relatively inexpensive low complexity, narrowband, transmitter and receiver. Such devices may also be deployed in locations in which radio communications conditions can make transmission and reception of signals more difficult.

A technique which has been proposed to improve a likelihood of communications devices to receive signals transmitted by a mobile communications network using an existing transmission format is to repeat a transmission of a signal representing a message from a mobile communications network. A receiver can combine the repeatedly received message to improve a likelihood of correctly detecting the message. Therefore a mobile communications network can be arranged to extend its radio coverage, particularly for less complicated mobile communications devices. Such a technique is known as coverage extension (or coverage enhancement).

However, the use of repeated message transmission so as to allow such coverage extension for narrowband transmitters and receivers may be problematic.

SUMMARY OF THE DISCLOSURE

In a first aspect, the present disclosure provides a terminal device for use in a wireless telecommunications system, the terminal device comprising: a receiver; a transmitter; and a controller; wherein the receiver is operable to receive a first control message from a base station, the first control message indicating a radio resource for use by at least one of the receiver and transmitter to exchange a signal with the base station and the first control message comprising a code generated on the basis of an identifier of an intended terminal device and a value of a time-dependent parameter at a transmission time of the first control message, the intended terminal device being a terminal device intended for exchanging the signal with the base station; and the controller is operable to: attempt to perform a predetermined process using the code of the first control message, an identifier of the terminal device and the value of the time-dependant parameter at the transmission time of the first control message; wherein: if the predetermined process is not successfully completed, disregard the first control message; if the predetermined process is successfully completed, control at least one of the receiver and transmitter to exchange a signal with the base station using the radio resource indicated by the first control message.

In an embodiment, the controller is operable to: control the receiver to receive a signal from the base station using the radio resource indicated by the first control message, the received signal being scrambled by the base station using the identifier of the intended terminal device, and attempt to perform a descrambling process on the received signal using the identifier of the terminal device, the descrambling process being successfully completed if the identifier of the terminal device is the identifier of the intended terminal device, wherein if the descrambling process is successfully completed, then the controller is operable to control the receiver to transmit an acknowledgement message to the base station, and if the descrambling process is not successfully completed, then the controller is operable to control the receiver to transmit a non-acknowledgement message to the base station.

In an embodiment, the controller is operable to: control the transmitter to transmit a signal to the base station using the radio resource indicated by the first control message, wherein the controller is operable to perform a scrambling process on the signal to be transmitted using the identifier of the terminal device; and determine whether a readable non-acknowledgement message has been received at the receiver from the base station, wherein: if a readable non-acknowledgement message is not received from the base station, then the controller determines that the signal has been successfully transmitted to the base station; and if a readable non-acknowledge is received from the base station, then the controller determines that the signal has not been successfully transmitted to the base station and controls the transmitter to re-transmit the signal to the base station.

In an embodiment, the receiver is operable to receive a non-acknowledgement message from the base station as part of a second control message from the base station, the second control message indicating a radio resource for use by the transmitter in re-transmitting the signal to the base station and the second control message comprising a code generated using the identifier of the intended terminal device and a value of the time-dependent parameter at the transmission time of the second control message, the value of the time-dependent parameter at the transmission time of the second control message being different to the value of the time-dependent parameter at the transmission time of the first control message so that the code of the second control message is different to the code of the first control message, and the controller is operable to: attempt to perform the predetermined process using the code of the second control message, the identifier of the terminal device and the value of the time-dependant parameter at the transmission time of the second control message, wherein: if the predetermined process is not successfully completed, then the controller is not able to read the received non-acknowledgement message and the controller determines that the received non-acknowledgement message is not readable; and if the predetermined process is successfully completed, then the controller is able to read the received non-acknowledgement message and the controller determines that the received non-acknowledgement message is readable.

In an embodiment, the identifier of the intended terminal device is a Radio Network Temporary Identifier (RNTI) of the intended terminal device; and the value of the time-dependent parameter at the transmission time of the first control message comprises a system frame number (SFN) of the first control message and a subframe number of the first control message.

In an embodiment, the first control message comprises a downlink control information (DCI) message for indicating the radio resource, and the code of the first control message is appended to the DCI message, the code comprising a cyclic redundancy code (CRC) generated on the basis of the DCI message which has been XOR-ed with a hash generated on the basis of the RNTI of the intended terminal device, the SFN of the first control message and the subframe number of the first control message; and the predetermined process attempted using the code comprises: generating a hash on the basis of an RNTI of the terminal device, the SFN of the first control message and the subframe number of the first control message; XOR-ing the previously XOR-ed CRC with the generated hash; and attempting a decode operation on the CRC, wherein if the decode operation of the CRC is successful, then the predetermined process is determined to have been successfully completed; and if the decode operation of the CRC is not successful, then the predetermined process is determined not to have been successfully completed.

In an embodiment, the hash generated on the basis of the RNTI of the intended terminal device, the SFN of the first control message and the subframe number of the first control message is generated by cyclically shifting a portion of the bits representing the RNTI of the intended terminal device by the SFN and subframe number; and the hash generated on the basis of the RNTI of the terminal device, the SFN of the first control message and the subframe number of the first control message is generated by cyclically shifting a portion of the bits representing the RNTI of the terminal device by the SFN and subframe number.

In an embodiment, the first control message comprises a downlink control information (DCI) message for indicating the radio resource, and the code of the first control message is appended to the DCI message, the code comprising a cyclic redundancy code (CRC) generated on the basis of a concatenated bit stream comprising the DCI message, the SFN of the first control message, the subframe number of the first control message and the RNTI of the intended terminal device; and the predetermined process attempted using the code comprises: generating a concatenated a bit stream comprising the DCI message, the SFN of the first control message, the subframe number of the first control message and an RNTI of the terminal device; calculating a CRC on the basis of the generated concatenated bit stream; comparing the calculated CRC with the CRC appended to the received DCI message; if the calculated CRC and the CRC appended to the received DCI message match, then the predetermined process is determined to have been successfully completed, and if the calculated CRC and the CRC appended to the received DCI message do not match, then the predetermined process is determined not to have been successfully completed.

In an embodiment, the first control message comprises a downlink control information (DCI) message for indicating the radio resource, and the code of the first control message is appended to the DCI message, the code comprising a hash generated on the basis of the RNTI of the intended terminal device, the SFN of the first control message, the subframe number of the first control message and a cyclic redundancy code (CRC) generated on the basis of the DCI message; and the predetermined process attempted using the code comprises: calculating a CRC on the basis of the received DCI message; generating a hash on the basis of an RNTI of the terminal device, the SFN of the first control message, the subframe number of the first control message and the generated CRC; comparing the generated hash with the hash appended to the received DCI message; if the generated hash and the hash appended to the received DCI message match, then the predetermined process is determined to have been successfully completed; and if the generated hash and the hash appended to the received DCI message do not match, then the predetermined process is determined not to have been successfully completed.

In an embodiment, the first control message is repeatedly received a plurality of times and the SFN and subframe number of the first control message are determined to be the SFN and subframe number of the first repetition of the first control message.

In an embodiment, the first control message is repeatedly received a plurality of times and the SFN and subframe number of the first control message are determined to be the SFN and subframe number of the final repetition of the first control message.

In an embodiment, the code of the first control message has a shorter bit length than the identifier of the intended terminal device.

In an embodiment, the RNTI of each of the intended terminal device and the terminal device has a bit length of 16 bits and the code appended to the DCI message has a bit length of 8 bits.

In an embodiment, the identifier of the intended terminal device is a Radio Network Temporary Identifier (RNTI) of the intended terminal device; and the value of the time-dependent parameter at the transmission time of the second control message comprises a system frame number (SFN) of the second control message and a subframe number of the second control message.

In an embodiment, the second control message comprises a downlink control information (DCI) message for indicating the radio resource, and the code of the second control message is appended to the DCI message, the code comprising a cyclic redundancy code (CRC) generated on the basis of the DCI message which has been XOR-ed with a hash generated on the basis of the RNTI of the intended terminal device, the SFN of the second control message and the subframe number of the second control message; and the predetermined process attempted using the code comprises: generating a hash on the basis of an RNTI of the terminal device, the SFN of the second control message and the subframe number of the second control message; XOR-ing the previously XOR-ed CRC with the generated hash; and attempting a decode operation on the CRC, wherein if the decode operation of the CRC is successful, then the predetermined process is determined to have been successfully completed; and if the decode operation of the CRC is not successful, then the predetermined process is determined not to have been successfully completed.

In an embodiment, the hash generated on the basis of the RNTI of the intended terminal device, the SFN of the second control message and the subframe number of the second control message is generated by cyclically shifting a portion of the bits representing the RNTI of the intended terminal device by the SFN and subframe number; and the hash generated on the basis of the RNTI of the terminal device, the SFN of the second control message and the subframe number of the second control message is generated by cyclically shifting a portion of the bits representing the RNTI of the terminal device by the SFN and subframe number.

In an embodiment, the second control message comprises a downlink control information (DCI) message for indicating the radio resource, and the code of the second control message is appended to the DCI message, the code comprising a cyclic redundancy code (CRC) generated on the basis of a concatenated bit stream comprising the DCI message, the SFN of the second control message, the subframe number of the second control message and the RNTI of the intended terminal device; and the predetermined process attempted using the code comprises: generating a concatenated a bit stream comprising the DCI message, the SFN of the second control message, the subframe number of the second control message and an RNTI of the terminal device; calculating a CRC on the basis of the generated concatenated bit stream; comparing the calculated CRC with the CRC appended to the received DCI message; if the calculated CRC and the CRC appended to the received DCI message match, then the predetermined process is determined to have been successfully completed, and if the calculated CRC and the CRC appended to the received DCI message do not match, then the predetermined process is determined not to have been successfully completed.

In an embodiment, the second control message comprises a downlink control information (DCI) message for indicating the radio resource, and the code of the second control message is appended to the DCI message, the code comprising a hash generated on the basis of the RNTI of the intended terminal device, the SFN of the second control message, the subframe number of the second control message and a cyclic redundancy code (CRC) generated on the basis of the DCI message; and the predetermined process attempted using the code comprises: calculating a CRC on the basis of the received DCI message; generating a hash on the basis of an RNTI of the terminal device, the SFN of the second control message, the subframe number of the second control message and the generated CRC; comparing the generated hash with the hash appended to the received DCI message; if the generated hash and the hash appended to the received DCI message match, then the predetermined process is determined to have been successfully completed; and if the generated hash and the hash appended to the received DCI message do not match, then the predetermined process is determined not to have been successfully completed.

In an embodiment, the second control message is repeatedly received a plurality of times and the SFN and subframe number of the second control message are determined to be the SFN and subframe number of the first repetition of the second control message.

In an embodiment, the second control message is repeatedly received a plurality of times and the SFN and subframe number of the second control message are determined to be the SFN and subframe number of the final repetition of the second control message.

In an embodiment, the code of the second control message has a shorter bit length than the identifier of the intended terminal device.

In an embodiment, the RNTI of each of the intended terminal device and the terminal device has a bit length of 16 bits and the code appended to the DCI message has a bit length of 8 bits.

In a second aspect, the present disclosure provides a base station for use in a wireless telecommunications system, the base station comprising: a receiver; a transmitter; and a controller; wherein the transmitter is operable to transmit a first control message to a plurality of terminal devices, the first control message indicating a radio resource for use by at least one of the receiver and transmitter to exchange a signal with an intended terminal device of the plurality of terminal devices and the first control message comprising a code generated using an identifier of the intended terminal device and a value of a time-dependent parameter at a transmission time of the first control message, the intended terminal device being a terminal device intended for exchanging the signal with the base station; and control at least one of the receiver and transmitter to exchange a signal with the intended terminal device using the radio resource indicated by the first control message.

In an embodiment, the controller is operable to: control the transmitter to transmit a signal to the plurality of terminal devices using the radio resource indicated by the first control message, wherein the controller is operable to scramble the signal to be transmitted using the identifier of the intended terminal device, and control the receiver to receive at least one of an acknowledgement message from the intended terminal device, a non-acknowledgement message from the intended terminal device and a non-acknowledgement message from a different terminal device of the plurality of terminal devices, wherein: if an acknowledgement message is received and no non-acknowledgement message is received, then the controller determines the signal to have been successfully received and descrambled by the intended terminal device, and if a non-acknowledgement message is received, then the controller is operable to control the transmitter to transmit a second control message to the plurality of terminal devices, the second control message indicating a radio resource for use by the transmitter to re-transmit the signal to the intended terminal device and the second control message comprising a code generated using the identifier of the intended terminal device and a value of the time-dependent parameter at the transmission time of the second control message, the value of the time-dependent parameter at the transmission time of the second control message being different to the value of the time-dependent parameter at the transmission time of the first control message so that the code of the second control message is different to the code of the first control message, and to re-transmit the signal to the plurality of terminal devices using the radio resource indicated by the second control message, wherein the controller is operable to scramble the signal to be transmitted using the identifier of the intended terminal device.

In an embodiment, the controller is operable to: control the receiver to receive a signal from at least one of the intended terminal device and a different terminal device of the plurality of terminal devices, each received signal being transmitted by the intended terminal device or the different terminal device using the radio resource indicated by the first control message, and each received signal being scrambled according to an identifier of the one of the intended terminal device and different terminal device from which it is transmitted, and attempt to perform a descrambling process on each received signal using the identifier of the intended terminal device, the descrambling process being successfully completed for a received signal if the received signal has been scrambled according to the identifier of the intended terminal device, wherein: if the descrambling process is not successfully completed for each received signal, then the controller is operable to control the transmitter to transmit a non-acknowledgement message to the plurality of terminal devices indicating that the descrambling process has not been successfully completed, the non-acknowledgement message being transmitted as part of a second control message, the second control message indicating a radio resource for use by the receiver to re-receive the signal from the intended terminal device and the second control message comprising a code generated using the identifier of the intended terminal device and a value of the time-dependent parameter at the transmission time of the second control message, the value of the time-dependent parameter at the transmission time of the second control message being different to the value of the time-dependent parameter at the transmission time of the first control message so that the code of the second control message is different to the code of the first control message.

In an embodiment, the controller is operable to: determine an identifier of each terminal device in the plurality of terminal devices; generate a candidate code of the first control message using the identifier of the intended terminal device and a value of the time-dependent parameter at a first potential transmission time of the first control message; determine whether the candidate code of the first control message will be generated using an identifier of another terminal device of the plurality of terminal devices and the value of the time-dependent parameter at the first potential transmission time of the first control message; if it is determined that the candidate code of the first control message will not be generated using an identifier of another terminal device of the plurality of terminal devices and the value of the time-dependent parameter at the first potential transmission time of the first control message, control the transmitter to transmit the first control message at the first potential transmission time with the candidate code as the code of the first control message; and if it is determined that the candidate code of the potential first control message will be generated using an identifier of another terminal device of the plurality of terminal devices and the value of the time-dependent parameter at the first potential transmission time of the first control message, control the transmitter to transmit the first control message at a different transmission time with a code generated using the identifier of the intended terminal device and a value of the time-dependent parameter at the different transmission time of the first control message.

A third aspect of the present disclosure provides a system comprising a terminal device according to the first aspect and a base station according to the second aspect.

A fourth aspect of the present disclosure provides a method of operating a terminal device for use in a wireless telecommunications system, the terminal device comprising a receiver and a transmitter, wherein the method comprises: controlling the receiver to receive a first control message from a base station, the first control message indicating a radio resource for use by at least one of the receiver and transmitter to exchange a signal with the base station and the first control message comprising a code generated on the basis of an identifier of an intended terminal device and a value of a time-dependent parameter at a transmission time of the first control message, the intended terminal device being a terminal device intended for exchanging the signal with the base station; attempting to perform a predetermined process using the code of the first control message, an identifier of the terminal device and the value of the time-dependant parameter at the transmission time of the first control message; if the predetermined process is not successfully completed, disregarding the first control message; and if the predetermined process is successfully completed, controlling at least one of the receiver and transmitter to exchange a signal with the base station using the radio resource indicated by the first control message.

A fifth aspect of the present disclosure provides a method of operating a base station for use in a wireless telecommunications system, the base station comprising a receiver and transmitter, wherein the method comprises: controlling the transmitter to transmit a first control message to a plurality of terminal devices, the first control message indicating a radio resource for use by at least one of the receiver and transmitter to exchange a signal with an intended terminal device of the plurality of terminal devices and the first control message comprising a code generated using an identifier of the intended terminal device and a value of a time-dependent parameter at a transmission time of the first control message, the intended terminal device being a terminal device intended for exchanging the signal with the base station; and controlling at least one of the receiver and transmitter to exchange a signal with the intended terminal device using the radio resource indicated by the first control message.

A sixth aspect of the present disclosure provides a terminal device for use in a wireless telecommunications system, the terminal device comprising: receiver circuitry; transmitter circuitry; and controller circuitry; wherein the receiver circuitry is operable to receive a first control message from a base station, the first control message indicating a radio resource for use by at least one of the receiver circuitry and transmitter circuitry to exchange a signal with the base station and the first control message comprising a code generated on the basis of an identifier of an intended terminal device and a value of a time-dependent parameter at a transmission time of the first control message, the intended terminal device being a terminal device intended for exchanging the signal with the base station; and the controller circuitry is operable to:attempt to perform a predetermined process using the code of the first control message, an identifier of the terminal device and the value of the time-dependant parameter at the transmission time of the first control message; wherein: if the predetermined process is not successfully completed, disregard the first control message; if the predetermined process is successfully completed, control at least one of the receiver circuitry and transmitter circuitry to exchange a signal with the base station using the radio resource indicated by the first control message.

A seventh aspect of the present disclosure provides a base station for use in a wireless telecommunications system, the base station comprising: receiver circuitry; transmitter circuitry; and controller circuitry; wherein the transmitter circuitry is operable to transmit a first control message to a plurality of terminal devices, the first control message indicating a radio resource for use by at least one of the receiver circuitry and transmitter circuitry to exchange a signal with an intended terminal device of the plurality of terminal devices and the first control message comprising a code generated using an identifier of the intended terminal device and a value of a time-dependent parameter at a transmission time of the first control message, the intended terminal device being a terminal device intended for exchanging the signal with the base station; and control at least one of the receiver circuitry and transmitter circuitry to exchange a signal with the intended terminal device using the radio resource indicated by the first control message.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with the same reference numerals and in which.

DESCRIPTION OF EXAMPLE EMBODIMENTS

Communications System

Figure 1:
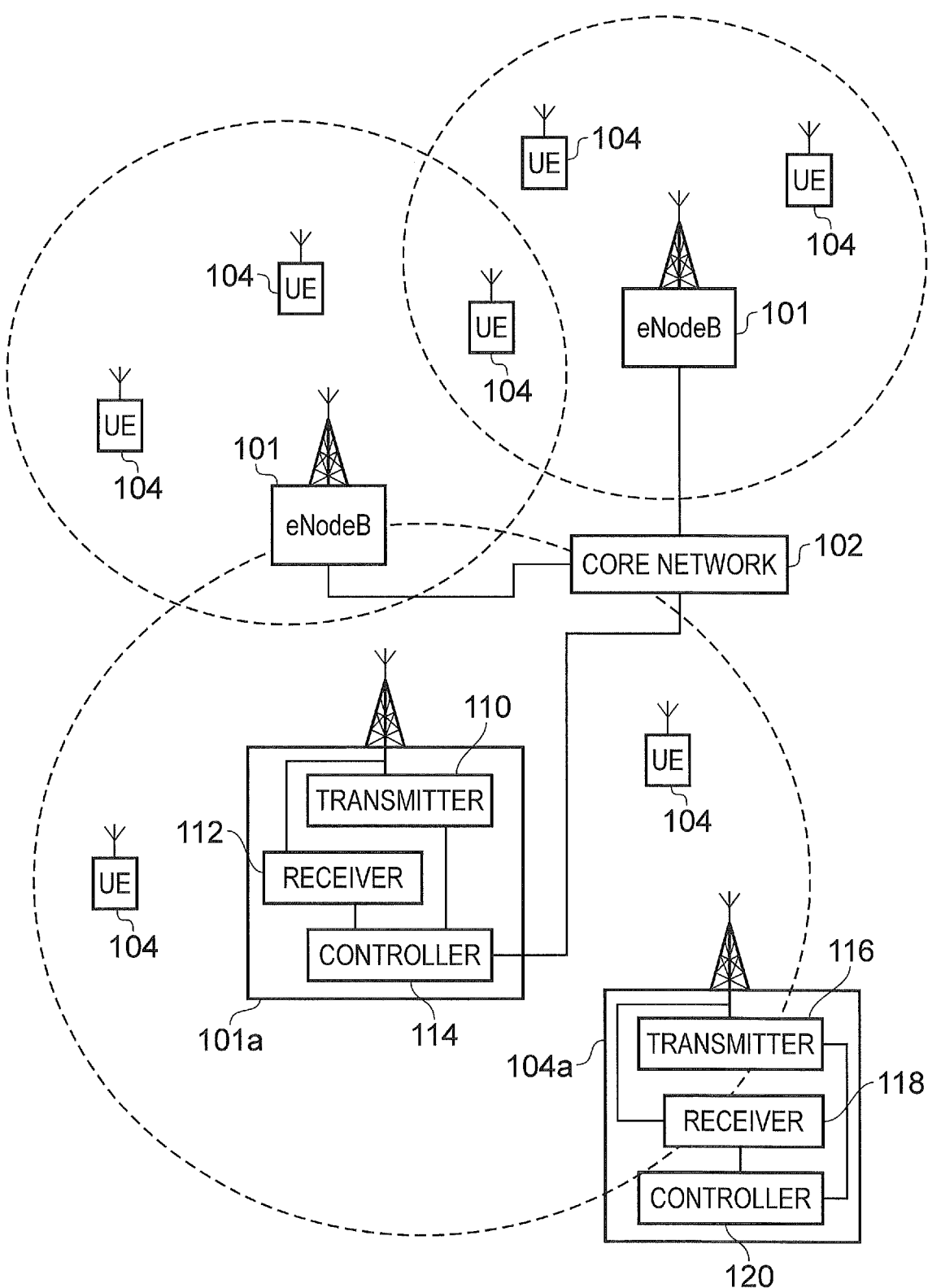
FIG. 1 provides a schematic block diagram of a mobile communications system in which communications devices are communicating via infrastructure equipment.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) standard.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

An example UE 104a is shown in more detail to include a transmitter 116 for transmitting signals on the uplink of the wireless access interface to the eNodeB 103 and a receiver 118 for receiving signals transmitted by the base station 101 on the downlink via the wireless access interface. The transmitter 116 and the receiver 118 are controlled by a controller 120. In the embodiments of the present disclosure, the UE 104a may be a Low Complexity Machine Type Communication (LC-MTC) terminal device.

LTE Wireless Access Interface

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
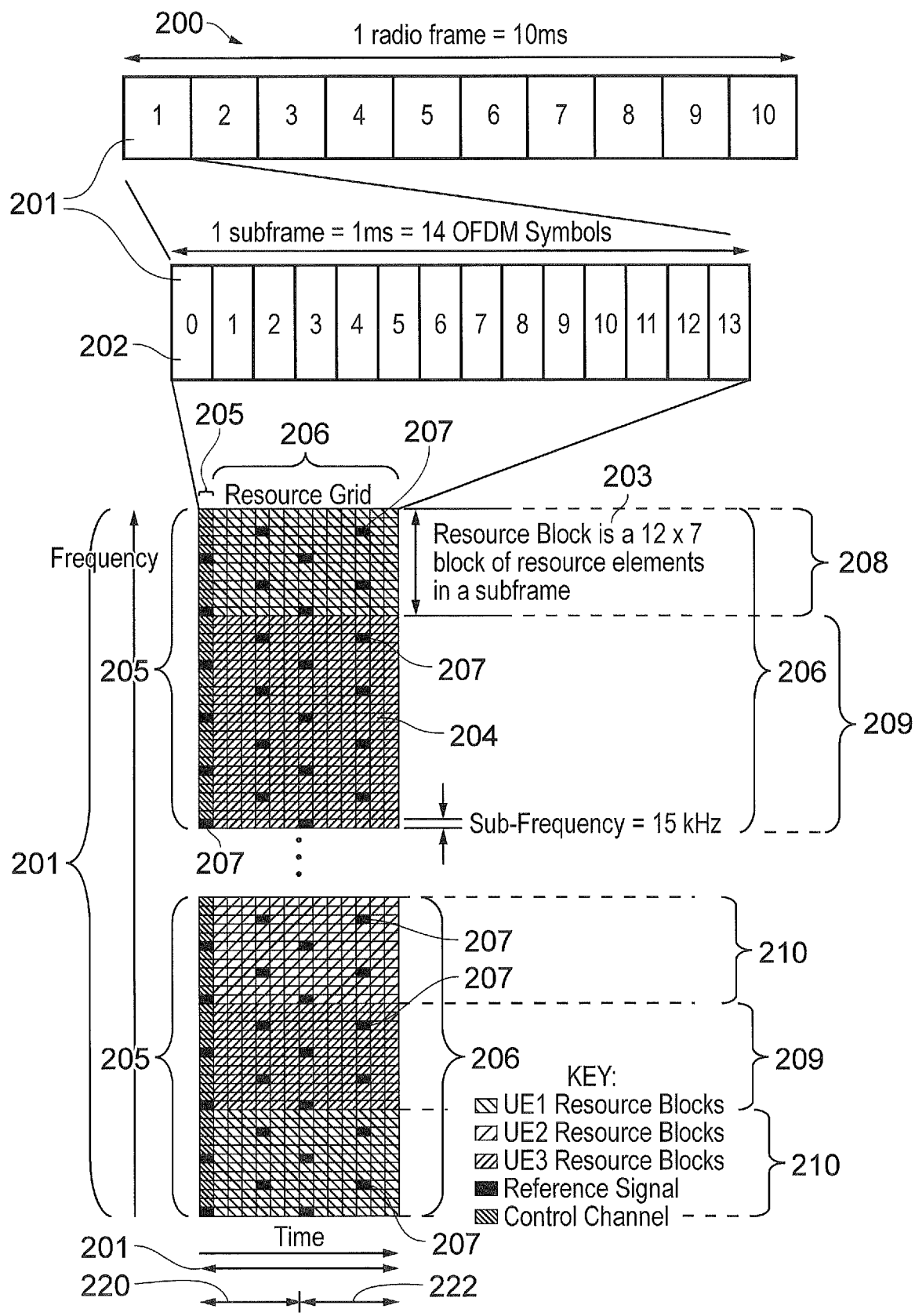
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1. However of particular relevance in understanding the example embodiments of the present technique are the downlink control channel referred to as the physical downlink control channel (PDCCH) and a shared channel of resources for transmitting data to UEs which is the physical downlink shared channel (PDSCH).

Figure 3:
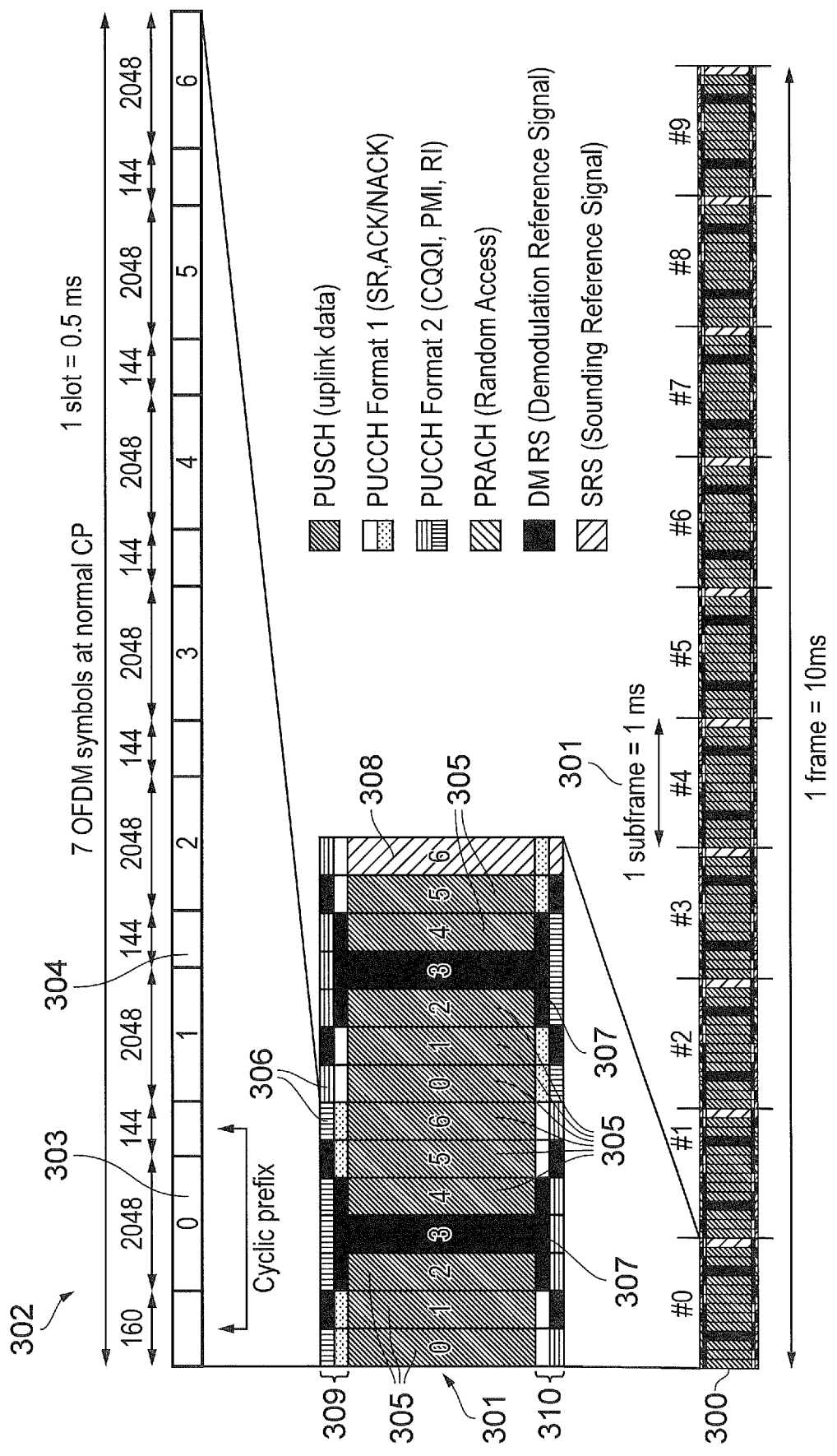
FIG. 3 provides a schematic diagram of an uplink of a wireless access interface of a mobile communications system operating according to an LTE standard.

FIG. 3 provides a simplified schematic diagram of the structure of an uplink of an LTE wireless access interface that may be provided by or in association with the base station of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

The LTE data or datagram is transmitted on the PDSCH on the downlink and on the PUSCH in the uplink. The resources on the PDSCH and the PUSCH are allocated to the terminal device by the base station. Prior to 3GPP Rel-11, the PDCCH was used to allocate these channels. From Rel-11, it has also been possible to allocate these channels using an enhanced PDCCH (ePDCCH).

ePDCCH Structure

Figure 4:
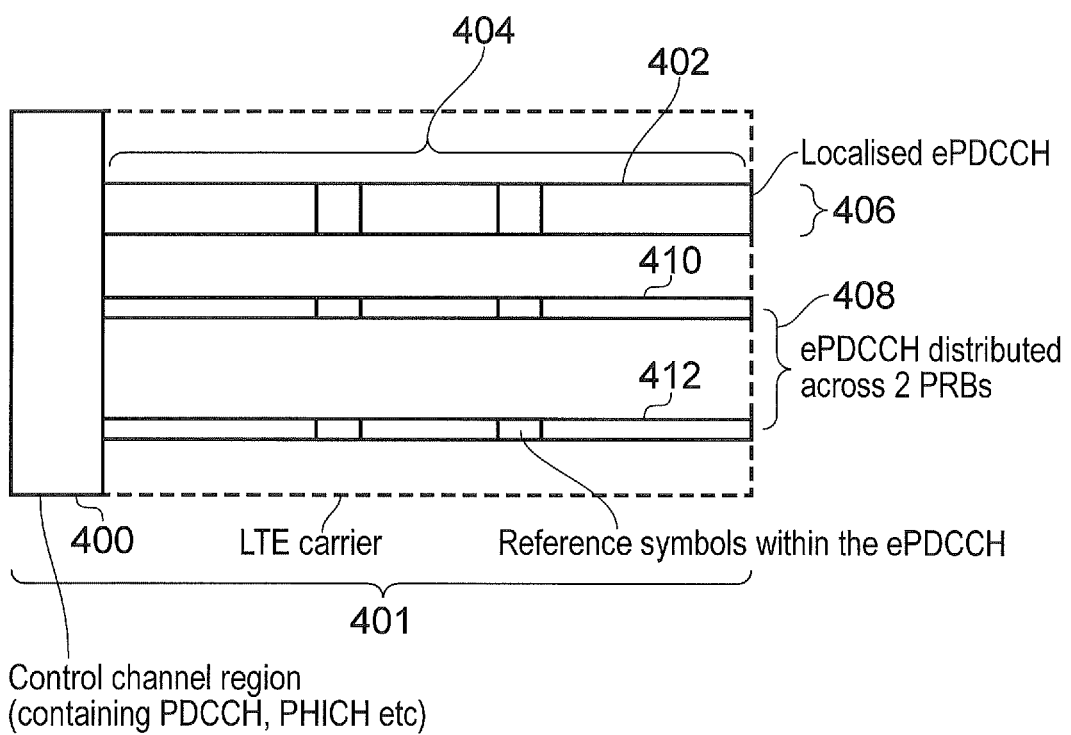
FIG. 4 is a schematic representation of a subframe of a wireless access interface, which includes a localised ePDCCH and a distributed ePDCCH.

FIG. 4 provides a schematic representation of a subframe in which an ePDCCH forms part of a wireless access interface according to an LTE standard. As shown in FIG. 4 a conventional control channel region 400 is shown within a subframe 401 which is transmitted in the first of the 1 to 3 OFDM symbols of the subframe 401. This example control channel corresponds to a conventional PDCCH 400 and is transmitted across the available bandwidth of the wireless access interface. In contrast, a localised enhanced PDCCH 402 is transmitted in time across the remaining part of the subframe 404 within a narrow band of frequency sub-carriers 406. An alternative example of an ePDCCH 408 comprises a first part 410 transmitted across a first group of frequencies and a second part 412 transmitted in the second group of frequencies so that the ePDCCH is distributed across two physical resource blocks.

As noted above, a wireless access interface according to an LTE standard provides for the transmission of non-access stratum data, such as user data, on the PDSCH on the downlink and on the PUSCH in the uplink. Communications resource elements on the PDSCH and PUSCH are allocated to the UE by the base station. Prior to 3GPP Release-11, the PDCCH was used to allocate these channels. From Release-11, it has also been possible to allocate these channels using an enhanced PDCCH (the ePDCCH). Therefore, effectively for the example shown in FIG. 4, the same control channel information can be transmitted on the PDCCH 400 or on the ePDCCH 402, 408 for either of the arrangements of the control channel arrangements shown in FIG. 4.

As can be appreciated from FIG. 4, the ePDCCH is essentially a narrowband control channel. As shown in FIG. 4, the ePDCCH can be transmitted in either a localized mode as shown for the first example 402 or in a distributed mode as shown for the second example 408. For the example of a localised mode of allocation, the ePDCCH can occupy a single PRB (physical resource block=12 OFDM subcarriers). It can also occupy a contiguous set of plural PRBs. When the base station (eNodeB) has knowledge about the channel conditions of the terminal device (UE), it can choose a physical resource block (PRB) that has particularly favourable channel conditions for the terminal device (e.g. avoiding fades). The base station can also choose a beamforming codebook entry to produce a beam that is targeted at that terminal device.

In a distributed mode of allocation, the ePDCCH occupies at least two PRBs. This mode of allocation is preferable when the base station does not have measurements or an indication representing radio channel conditions at the terminal device. This might occur for example if the terminal device is operating at a high speed, such that, for example, feedback from the terminal device is out of date when it arrives at the base station, or a dedicated beam from the base station cannot track a terminal device's position quickly enough, or when feedback from the terminal device is intermittent, for example when the UE is operating with a low data rate bursty traffic model.

Coverage Enhancement and MDPCCH

Low Complexity Machine Type Communication (LC-MTC) terminal devices (UEs) are currently being specified in 3GPP. The main features of LC-MTC UE are low complexity (and therefore low cost), coverage enhancement and reduced power consumption.

The main technique to reduce complexity for LC-MTC UE is to restrict the UE to operate within 6 PRBs. The bandwidth of the wireless telecommunications system is therefore divided into multiple 6 PRB narrowbands and the LC-MTC UE is expected to be able to tune into any of these narrowbands.

In the coverage enhancement (CE) feature, the coverage for LC-MTC is extended by 15 dB (relative to that of Cat-1 UE). The main technique for CE is via numerous repetitions of the same message.

Downlink Control Information (DCI) is sent to the UE by the eNB for scheduling and control purposes (including scheduling resources on the PDSCH and PUSCH for use by a particular UE). In the legacy system DCI can be sent using the Enhanced Physical Downlink Control Channel (EPD-CCH), as explained above. There are multiple EPDCCH candidates where each EPDCCH candidate occupies different resources. These candidates are signalled to the UE and the set of different EPDCCH candidates forms a search space. The eNB transmits the DCI using one of the EPD-CCH candidates and hence the UE needs to blind decode for the EPDCCH, that is, try all possible EPDCCH candidates within the search space until it detects the EPDCCH used by the eNB. It is noted that the eNB may not transmit any DCI to the UE and in this case, the UE will not detect any EPDCCH.

For LC-MTC, the DCI is carried by (what is currently known as) MPDCCH (or M-PDCCH) (where the 'M' is currently understood to stand for "machine" or "MTC"). MPDCCH is based on the EPDCCH design. In a coverage enhancement mode, the MPDCCH is repeated over a plurality of subframes so as to allow an LC-MTC UE to determine the DCI carried by the MPDCCH even in a poor coverage area. The MDPCCH comprising the DCI is an example of a control message, a control message being any message comprising information which schedules downlink radio resources for radio transmission from a base station to a terminal device and/or uplink radio resources for radio transmission from a terminal device to a base station.

The Release-13 3GPP work on MTC targets complexity reduction of the LTE UE and also coverage enhancement (relative to the coverage of an LTE network deployed for standard LTE UEs, such as smartphones).

As previously mentioned, the basic coverage enhancement technique that is going to be applied to LC-MTC is repetition of signals. Repetition of signals takes up many physical resources. When a coverage enhancement of 15 dB is required, simulations have shown that it might be necessary to repeat some physical channels of the order of 50-100 times (or more), for example. In order to make coverage enhancement operation of LC-MTC more efficient, the present technique recognises that it is beneficial to reduce the payload size of one or more of the physical channels (such as the PDSCH, PUSCH, M-PDCCH and/or PUCCH).

Examples of the present technique focus, in particular, on reducing the payload size of the M-PDCCH. The M-PDCCH is a downlink physical control channel that allocates both uplink (UL) and downlink (DL) resources to the UE. The resource allocation is transmitted in a downlink control information (DCI) message, as previously mentioned. Example contents of a DCI message are listed in Table 1 (for DCI format 1A and for a UE operating in a 1.4 MHz channel bandwidth). A 16 bit cyclic redundancy code (CRC) is appended to the DCI message.

TABLE 1

Example fields transmitted in a DCI message format 1A

| Field | Number of bits | Usage |
| --- | --- | --- |
| Format 0/1A flag | 1 | Identifies which format of DCI is being signalled |
| Localised/ distributed flag | 1 | Indicates whether PDSCH resources are localised or distributed in nature |
| Resource block allocation | 5 | Identifies the which physical resources (symbols, subcarriers) |

TABLE 1-continued

Example fields transmitted in a DCI message format 1A

| Field | Number of bits | Usage |
| --- | --- | --- |
| | | are assigned to PDSCH |
| MCS (modulation and coding scheme) | 5 | Indicates modulation and coding scheme applied to transmission to UE |
| HARQ (hybrid automatic repeat request) process number | 3 | Identifies which HARQ process is being scheduled |
| New data indicator | 1 | Identifies whether the PDSCH transmits an initial transmission or a retransmission into this HARQ process |
| Redundancy version | 2 | Indicates which set of parity bits and systematic bits are transmitted to the UE on the PDSCH |
| TPC (transmit power control) command for PUCCH | 2 | Transmit power control command for PUCCH |
| Total | 20 | |
| Total including CRC | 36 | |

Various techniques are being considered to reduce the size of the M-PDCCH message, including reducing the number of bits in the DCI messages and reducing the size of the appended CRC. When large amounts of coverage enhancement are applied, the number of bits in the DCI message could be reduced in the following ways:

Remove "localised/distributed flag". When the allocation uses all the physical resources, the concept of localised/distributed allocation does not exist.

Remove the "resource block allocation" field: when UEs are allocated in coverage enhancement mode, they can be allocated all of the available physical resources.

Remove "MCS" field. Coverage enhancement UEs may always use the most robust transmission format.

Reduce "HARQ process number" to 1 bit field: the LC-MTC UE may operate with a smaller number of HARQ processes.

Remove "redundancy version" field. Coverage enhancement UEs will operate with code rates of less than $1/39$. In this case, there is no performance gain from transmitting different redundancy versions (the same sets of parity and systematic bits are sent in every (re)-transmission).

Remove TPC command for PUCCH. When the UE is coverage limited, it needs to transmit the PUCCH at maximum UE transmit power.

The following fields may be transmitted in addition to the fields listed in Table 1:

Transport block size. 5 bits. This would effectively replace the MCS field.

Repetition level. 2 bits. Number of repetitions of the PDSCH. The actual repetition level could be chosen from an enumerated list, indicated by the "repetition level". For example, the repetition level field could indicate repetition level choices of {4, 8, 16, 32} times repetition.

Table 2 hence lists the field that may be transmitted in the DCI for LC-MTC UEs in large coverage enhancement.

TABLE 2

Example fields transmitted in a DCI message format 1A

| Field | Number of bits | Usage |
|---|---|---|
| HARQ process number | 1 | Identifies which HARQ process is being scheduled |
| New data indicator | 1 | Identifies whether the PDSCH transmits an initial transmission or a retransmission into this HARQ process |
| Transport block size | 5 | Size of transport block carried on physical resource |
| Repetition level | 2 | Index pointing to number of repetitions of PDSCH |
| Total | 9 | |
| Total including CRC | 25 | |

Table 2 shows that in the coverage enhancement mode of operation, the number of bits used to transmit the CRC is disproportionate to the number of bits used to transmit the DCI (16 out of 25 bits=64% of the M-PDCCH resource is used to transmit CRC information).

In LTE, the RNTI (radio network temporary identifier) is XOR-ed with the CRC of the M-PDCCH. When the UE decodes the M-PDCCH, it XORs its RNTI with the CRC prior to decoding the CRC. Only the UE with the correct RNTI is able to correctly decode the M-PDCCH.

However, there is a false alarm probability associated with decoding the M-PDCCH. If a UE attempts to decode unknown data or noise, the CRC will give a CRC_OK result (indicating that the CRC has been successfully decoded) for one out of every 2○CRC_length attempted decodings of the M-PDCCH. Such a result applied to unknown data or noise is known as a false alarm, because it does not genuinely represent successful decoding of an M-PDCCH intended for that UE. For the current LTE specifications, the CRC_length is 16 bits (hence the false alarm probability is 1.5e-5). However, if the CRC length is reduced, then the false alarm probability is increased. For example, if the CRC length is reduced to 8 bits, then the false alarm probability would be 1/256=3.9e-3). This increased false alarm probability is a problem.

It is noted that the PDSCH in LTE is scrambled with a scrambling sequence that is based on the UE's RNTI. Furthermore, the PUSCH in LTE is scrambled with a scrambling sequence that is based on the UE's RNTI.

The PUCCH in LTE is scrambled with one of the following:
Format 1: scrambled at the symbol level depending on the slot within the subframe & PUCCH resource index
Formats 2, 2A, 2B: UE's RNTI at the bit level
Format 3: UE's RNTI at the bit level The M-PDCCH in LTE is scrambled with a scrambling sequence that is based on the cell ID (i.e. the scrambling sequence is the same for all UEs in the cell).

Examples of the present technique use a reduced CRC size for MPDCCH where the CRC is scrambled with a code that changes with time. More particularly, in one example:

The CRC applied to the M-PDCCH is smaller than 16 bits. The length of the CRC is $n_{CRC}$ bits (for example, 8 bits).

The CRC of the M-PDCCH is scrambled with a code with value M_PDCCH_HASH (of length $n_{CRC}$ bits) that is a function of the UE's RNTI which changes with time. This is different to the known arrangement in which the CRC is scrambled directly with the UE's RNTI (rather than a function of the UE's RNTI which changes with time, as with this example of the present technique).

The value of M_PDCCH_HASH that is produced as a function of the UE's RNTI which changes in time. Examples are:

M_PDCCH_HASH is the lowest $n_{CRC}$ bits of the UE's RNTI cyclically shifted by the subframe number and the system frame number of the subframe and system frame in which the M-PDCCH is transmitted.

M_PDCCH_HASH is a hash value based on the following inputs to a hashing function:
UE RNTI
System frame number of the system frame in which the M-PDCCH is transmitted
Subframe number of the subframe in which the M-PDCCH is transmitted (in a coverage extension mode of operation, the subframe number and system frame number can relate to the first subframe/frame of a repeated M-PDCCH)

When the UE decodes the M-PDCCH, it uses the M_PDCCH_HASH value that is appropriate for that subframe and system frame number. Hence if the UE incorrectly decodes an M-PDCCH (destined for another UE) in one subframe (resulting in a false alarm), it doesn't decode that M-PDCCH in a subsequent subframe if the M-PDCCH is re-transmitted (upon detection of the false alarm by the base station).

Figure 5:
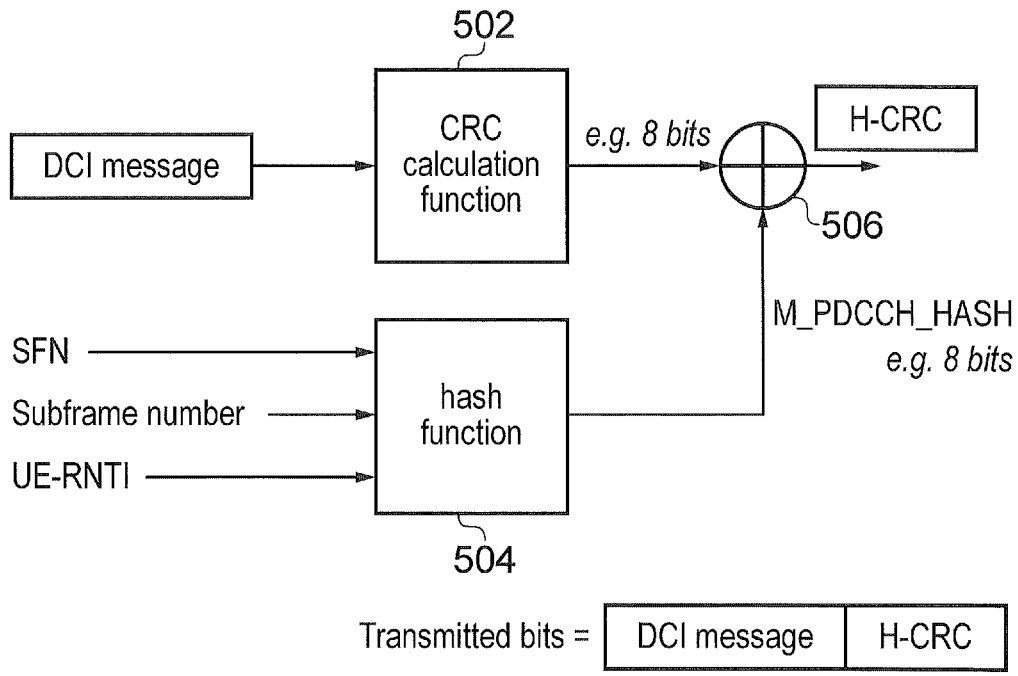
FIG. 5 provides a schematic representation of generating a code for a control message according to a first example.

FIG. 5 illustrates the construction of an 8 bit M_PDCCH_HASH value ($n_{CRC}$=8) and its use in XOR-ing the CRC of the DCI message of the M-PDCCH. In particular, the DCI message is input to a CRC calculation function 502, which outputs an 8 bit CRC. The subframe number, system frame number (SFN) and UE-RNTI of the UE for which the M-PDCCH is intended are input to a hash calculation function 504, which outputs an 8 bit hash code. The CRC is then XOR-ed with the hash code by adder 506 to produce a hashed CRC (H-CRC). The DCI message is appended with the H-CRC value and these are transmitted as the M-PDCCH. The process of FIG. 5 is carried out by the controller 114 of the base station 101 which transmits the M-PDCCH.

Each UE which receives the M-PDCCH then attempts a predetermined process on the received M-PDCCH to try to decode the H-CRC. The predetermined process comprises generating a hash on the basis of the UE-RNTI of the receiving UE and the SFN and the subframe number of the M-PDCCH. The generated hash is then XOR-ed with the received H-CRC with the generated hash to obtain a CRC. An attempt is then made to decode the CRC. Because of the use of the hash, unless there is a false alarm, the CRC decode operation will only be successful if the UE-RNTI of the receiving UE is the UE-RNTI of the intended UE (that is, only the UE intended to receive the M-PDCCH will be able to successfully perform the CRC decode operation). A successful decode operation indicates to the receiving UE that it is the intended UE and that it should therefore use the resources indicated by the received M-PDCCH. On the other hand, a non-successful decode operation indicates to the receiving UE that it is not the intended UE, and thus the received M-PDCCH is disregarded. The described predetermined process is carried out by the controller 120 of a receiving UE 104.

Figure 6:
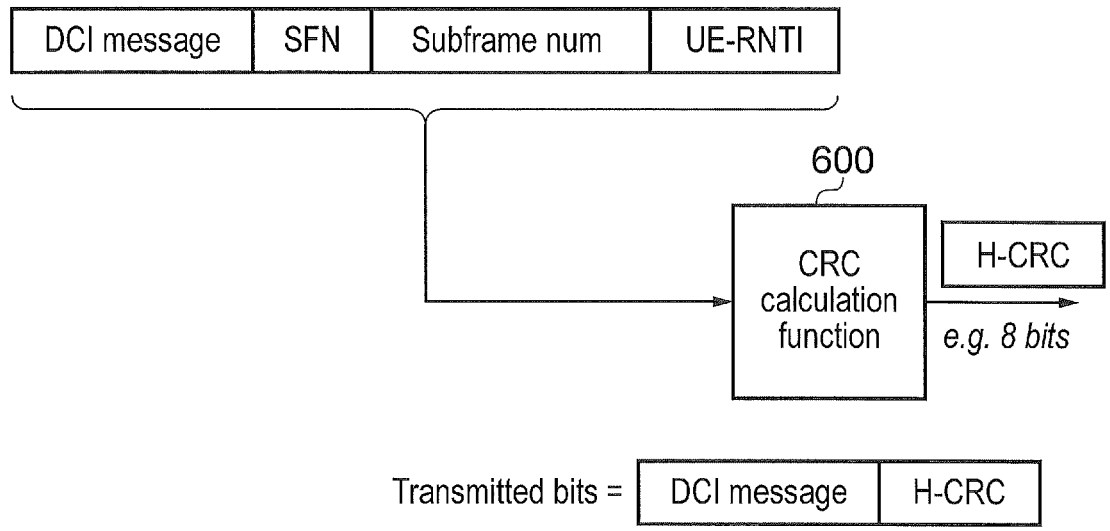
FIG. 6 provides a schematic representation of generating a code for a control message according to a second example.

FIG. 6 illustrates an alternative example of the present technique. In this example, the DCI message, SFN and subframe number of the M-PDCCH and the UE-RNTI of the UE for which the M-PDCCH is intended are concatenated to form a bit stream. The bit stream then is fed into a CRC calculation function 600, wherein an 8 bit CRC (H-CRC) is generated and output. The DCI message and generated CRC are then transmitted as the M-PDCCH. Again, the process of FIG. 6 is carried out by the controller 114 of the base station 101 which transmits the M-PDCCH.

Each UE which receives the M-PDCCH then attempts a predetermined process on the received M-PDCCH. The predetermined process comprises generating a concatenated bit stream comprising the DCI message, the SFN and the subframe number of the received M-PDCCH and the RNTI of the receiving UE and calculating a CRC on the basis of the generated concatenated bit stream. The CRC is calculated using the same CRC calculation function 600. The calculated CRC is then compared with the CRC appended to the received DCI message (this being the H-CRC) to see if there is a match. Because of the way the CRC generated by the receiving UE and the CRC of the received M-PDCCH message are generated, unless there is a false alarm, there will only be a match if the UE-RNTI of the receiving UE is the UE-RNTI of the intended UE (that is, only the UE intended to receive the M-PDCCH will be able to generated a CRC which matches that of the received M-PDCCH). If there is a match, then this indicates to the receiving UE that it is the intended UE and that it should therefore use the resources indicated by the received M-PDCCH. On the other hand, if there is no match, this indicates to the receiving UE that it is not the intended UE, and thus the received M-PDCCH is disregarded. The described predetermined process is again carried out by the controller 120 of a receiving UE 104.

Figure 7:
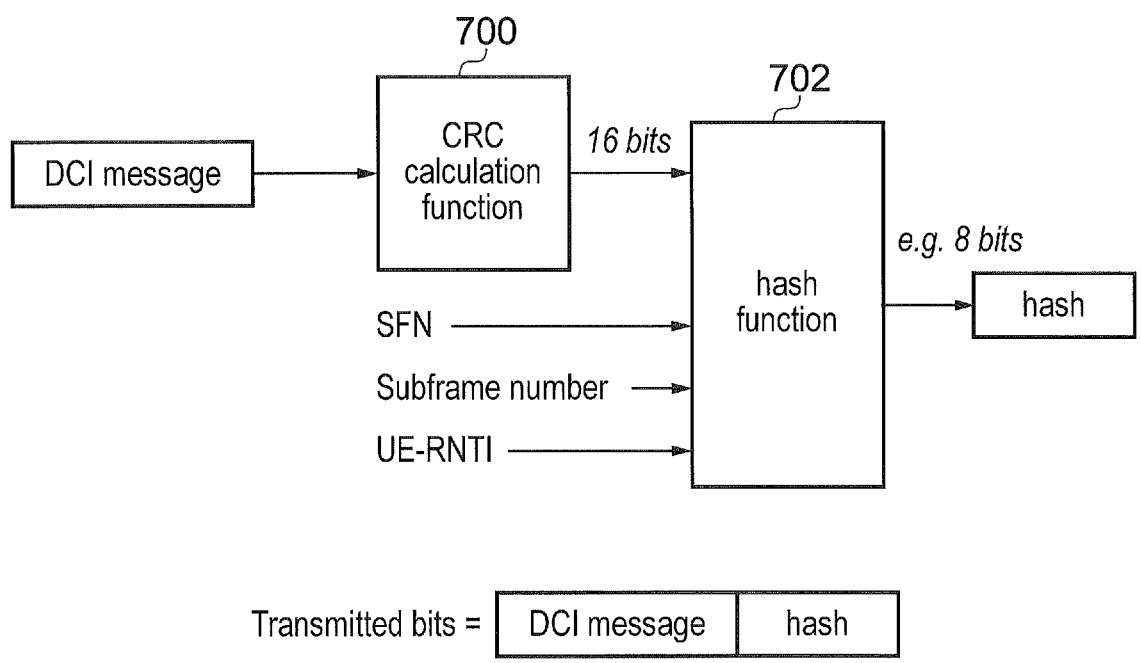
FIG. 7 provides a schematic representation of generating a code for a control message according to a third example.

FIG. 7 illustrates an alternative example of the present technique. In this example, the DCI message is fed into a CRC calculation function 700 to produce a 16 bit CRC. The CRC, the SFN and subframe number of the M-PDCCH and the UE-RNTI of the UE for which the M-PDCCH is intended are fed into a hashing function 702. The hashing function 702 produces and outputs an 8 bit hash. The DCI message and hash are transmitted as the M-PDCCH. Again, the process of FIG. 7 is carried out by the controller 114 of the base station 101 which transmits the M-PDCCH.

Each UE which receives the M-PDCCH then attempts a predetermined process on the received M-PDCCH. In particular, at each UE receiver, the UE calculates an expected CRC based on the received DCI message. It inputs this expected CRC, the SFN and subframe number of the received M-PDCCH and UE-RNTI of the receiving UE into a hashing function to produce an expected 8 bit hash. This hashing function is the same hashing function 702 used by the base station. The UE then compares the received 8 bit hash to the expected 8 bit hash to determine if there is a match. Because of the way the hash is generated by the base station and each receiving UE, there will only be a match if the UE-RNTI of the receiving UE is the UE-RNTI of the intended UE (that is, only the UE intended to receive the M-PDCCH will be able to generate a hash which matches that of the received M-PDCCH). If there is a match, then this indicates to the receiving UE that it is the intended UE and that it should therefore use the resources indicated by the received M-PDCCH. On the other hand, if there is no match, this indicates to the receiving UE that it is not the intended UE, and thus the received M-PDCCH is disregarded. The described predetermined process is again carried out by the controller 120 of a receiving UE 104.

Thus, it will be appreciated that, generally, according to examples of the present technique, a terminal device 104 receives a control message (the MPDCCH being an example of a control message) from a base station 101. The control message indicates a radio resource for use by at least one of the receiver 118 and transmitter 116 of the terminal device to exchange a signal with the base station, and the control message comprising a code (such as the H-CRC of FIG. 5, the H-CRC of FIG. 6 or the hash of FIG. 7) generated on the basis of an identifier of an intended terminal device (such as the RNTI of the intended terminal device) and a value of a time-dependent parameter at a transmission time of the control message (for example, the SFN and subframe number of the control message). The controller 120 of the terminal device then attempts to perform a predetermined process using the code of the first control message, an identifier of the terminal device (such as the RNTI of the terminal device) and the value of the time-dependant parameter at the transmission time of the first control message. For example, the predetermined process may be that described with reference to FIG. 5, 6 or 7. If the predetermined process is not successfully completed, then the control message is disregarded. On the other hand, if the predetermined process is successfully completed, then the controller 120 controls at least one of the receiver and transmitter to exchange a signal with the base station using the radio resource indicated by the control message. For example, the receiver will attempt to receive a signal allocated to radio resources in the PDSCH on the basis of the control message, and the transmitter will attempt to transmit a signal using radio resources in the PUSCH on the basis of the control message.

As has already been mentioned, in a coverage enhancement operation, the MPDCCH is repeatedly transmitted a plurality of times. In this case, in one example, the SFN and subframe number of the M-PDCCH used in the above-mentioned examples is the SFN & subframe number of the first MPDCCH repetition. In another example, the SFN and subframe number of the M-PDCCH used in the above-mentioned examples is the SFN & subframe number of the final MPDCCH repetition.

In one example of the present technique, the code included in the M-PDCCH (for example, the H-CRC of FIG. 5, the H-CRC of FIG. 6 or the hash of FIG. 7) is also a function of the retransmission number (in addition to being a function of the intended UE-RNTI and SFN and subframe number of the M-PDCCH). That is a first retransmission would use one code on the CRC and the second retransmission would use another code. This adds another layer of randomization into the generation of the code so as to help avoid collision of the reduced length CRC with that intended for use by another UE.

In one example of the present technique, the M-PDCCH with a reduced length code (with, for example, an 8 bit code appended to the DCI message rather than a 16 bit code appended to the DCI message, as described with reference to the above examples) is only applied for DCI formats that allocate DL resources (or, alternatively, only to UL resources). For example, if there are problematic error scenarios when applying a reduced length code to the UL in certain scenarios, then it may be beneficial to keep using a 16 bit length code for the UL, but the DL can still benefit from the reduced length code. In this case, when a UE performs an M-PDCCH blind decode process for a candidate DL DCI format, it would blind decode on the basis of a reduced length code, and when it performs an M-PDCCH blind decode process for a candidate UL DCI format, it would blind decode on the basis of a 16 bit code (or vice versa if the DL is associated with a 16 bit code and the UL is associated with a reduced length code).

Error Scenarios

As previously mentioned, there is a false alarm probability associated with decoding the M-PDCCH. If a UE attempts to decode unknown data or noise, there will occasionally be a positive result at a UE which is not the intended UE. In the examples given with reference to FIGS. 5, 6 and 7, such a false alarm occurs when the predetermined process performed by the receiving UE has a successful outcome even when the UE-RNTI of the receiving UE is not the UE-RNTI of the intended UE. This can occur due to noise or other communication channel conditions affecting the transmitted M-PDCCH. In this section, some of the potential error scenarios that occur due to false alarms associated with the use of a reduced length code are considered.

The error scenarios described in this section show that when the present technique is applied, the increased false alarm rate from the use of a smaller code in the M-PDCCH (for example, an 8 bit code rather than a 16 bit code) does not lead to significant problems. The main consequence is a slight increase in latency for the intended UE and the false alarm UE. In such a scenario, more than one UE may think that the DCI carried by the M-PDCCH is intended for it. However, this is then rectified in the next retransmission in which the M-PDCCH is appended with a different code (since the code used in examples of the present technique is time dependent).

Effect on PDSCH (Downlink)

Intended UE

The intended UE (which has correctly been able to successfully decode the M-PDCCH intended for it based on, for example, one of the techniques of FIG. 5, 6 or 7) receives the PDSCH correctly and sends an acknowledgement (ACK) on the PUCCH. However, the PUCCH is interfered with by a transmission from the false alarm UE. The false alarm UE has also decoded the M-PDCCH (although this is an accident) and has thus wrongly tried to receive the PDSCH of the intended UE. However, since the PDSCH is scrambled with the UE-RNTI of the intended UE (as previously mentioned), the false alarm UE will transmit NACK on the PUCCH. This is because the false alarm UE (which has a different UE-RNTI to the intended UE) cannot descramble the PDSCH. The NACK from the false alarm UE transmitted on the PUCCH and interferes with the ACK from the intended UE (which is also transmitted on the PUCCH).

At the base station, if the intended UE has transmitted an ACK on the PUSCH, but the false alarm UE has transmitted a NACK on the PUCCH (causing a NACK to be read, the controller 114 of the base station controls the transmitter 110 to re-transmit the M-PDCCH and PDSCH. Because of the time dependence of the code of the M-PDCCH, however, the re-transmission of the M-PDCCH has a different code to the original transmission of the M-PDCCH. The re-transmitted M-PDCCH with the different code is unlikely to be successfully decoded by the false alarm UE (since this would essentially require two different M-PDCCH messages to be accidently decoded one after the other by the same false alarm UE). The same false alarm UE should therefore not collide with the PDSCH re-transmission, and hence there should be no unintended PUCCH transmission from the false alarm UE this second time round. Furthermore, there is no significant adverse effect on the intended UE (which simply disregards the repeated PDSCH).

It is also noted that an ACK signal transmitted by the intended UE (as occurs when the intended UE has correctly received and descrambled the PDSCH) can be wrongly interpreted as a NACK signal by the base station under poor signalling conditions. In this case, the detection of the NACK signal by the base station results in the re-transmission of the M-PDCCH with a different code and the PDSCH, as previously described. Again, however, there is no significant adverse effect on the intended UE (which simply disregards the repeated PDSCH). The intended UE may also transmit a NACK if it cannot correctly receive and descramble the PDSCH (for example, if the received PDSCH is corrupted due to poor signalling conditions). In this case, the detection of the NACK signal by the base station again results in the re-transmission of the M-PDCCH with a different code and the PDSCH, thus providing the intended UE with another chance to receive and descramble the PDSCH.

False Alarm UE

As previously mentioned, the PDSCH for the intended UE is scrambled using the UE-RNTI of the intended UE (which is different to the UE-RNTI of the false alarm UE) and will therefore not be transmitted to upper layers of the false alarm UE. The PDSCH can be incorrectly added into an active HARQ buffer of the false alarm UE. This will make that HARQ process more difficult to decode. The consequence will either be:

The HARQ process takes more re-transmissions to decode

Re-transmission at MAC (Medium Access Control) layer

Such an event will occur infrequently, and when it occurs, the consequence will be an increase in latency. However, given that MTC traffic is generally delay tolerant, this is not a significant problem.

Effect on PUSCH (Uplink)

Intended UE

In response to receiving and decoding the M-PDCCH, the UE transmits PUSCH, but this is interfered with by a PUSCH from false alarm UE. As previously mentioned, however, the PUSCH transmitted by a UE is scrambled using the UE-RNTI of that UE. The probability of the false alarm UE's PUSCH being incorrectly determined as a PUSCH from the intended UE is therefore low. Rather, the base station is unlikely to be able to descramble the received PUSCH from the false alarm UE (since it will be trying to perform this descramble operation using the UE-RNTI of the intended UE), and will hence transmit a NACK. The NACK is transmitted together with a re-transmission of the M-PDCCH so that the M-PDCCH must be successfully decoded in order to receive the NACK (in particular, the NACK may be included in the DCI message of the re-transmitted M-PDCCH). Again, because the code of the M-PDCCH is time dependent, the code of the re-transmitted M-PDCCH is different from the code of the originally transmitted M-PDCCH. This means that the re-transmission of the M-PDCCH is unlikely to be accidently decoded by the same false alarm UE and that the same false alarm UE is unlikely to receive the NACK.

In response to the NACK transmitted by the base station, the intended UE (which is able to decode the re-transmitted M-PDCCH) re-transmits the PUSCH. The retransmission will be received in a HARQ buffer at the base station that has been corrupted (because of the PUSCH previously received from the false alarm UE). This will make it more difficult to decode the HARQ buffer and more re-transmissions will be required before the PUSCH is successfully decoded. Alternatively, a higher layer re-transmission is caused. In either case, the error condition is resolved after a slightly increased latency. However, again, given that MTC traffic is generally delay tolerant, this is not a significant problem.

It is noted that, in an alternative example, the NACK transmitted by the base station may be transmitted as part of the DCI message of an M-PDCCH which does not have a code appended to the DCI message (for example, the M-PDCCH may not have a CRC). In this case, the whole (or part of the) NACK message could be scrambled or hashed as a function of the UE-RNTI of the intended UE, the SFN and/or the subframe number of the M-PDCCH. In this sense, the scrambled or hashed NACK message represents a code of the M-PDCCH. The same applies for an ACK message transmitted by the base station using an M-PDCCH which does not have a code appended to the DCI message.

False Alarm UE

If the false alarm UE nonetheless has UL data to transmit, it commits this data to be transmitted in the HARQ process associated with the subframe in which the PUSCH transmission occurs.

If the eNodeB was not actively scheduling this false alarm UE, then a higher layer timer will expire (because the UE is not able to receive and decode the re-transmitted M-PDCCH, as has been described) and the UL data will reappear in the UL MAC buffers, ready to be scheduled at a future time. This will not cause any harm.

On the other hand, if the eNodeB was actively scheduling this false alarm UE (using another M-PDCCH which is genuinely intended for the false alarm UE):

If the UE interprets the M-PDCCH of the intended UE as indicating a new data transmission, then the UE may discard the previous UL data from its transmit buffers (assuming correct reception at the base station), causing a MAC layer retransmission.

If the UE interprets the M-PDCCH of the intended UE as indicating retransmission of a HARQ process, the UE will retransmit that UL data and the effect on the UE operation will be will be merely to transmit additionally in the UL, thus occasionally using more of the false alarm UE's battery reserve than necessary.

It is noted that, from the base station perspective, there should be no corruption of the base station's HARQ buffers for the false alarm UE (since the base station will be multiplexing the received signal to the intended UE's HARQ buffers rather than to the false alarm UE's HARQ buffers).

Thus, it is seen that, again, significant problems are avoided when the M-PDCCH scheduling uplink resources is accidently decoded by a false alarm UE.

It is noted that a false alarm will also occur if two UEs calculate the same code for a received M-PDCCH. This can occur for a reduced length code (for example, an 8 bit code as has been described with reference to FIG. 5, 6 or 7 rather than a 16 bit CRC code) due to the reduction in the number of possible codes caused by the reduced length (for example, for a 16 bit code, there are 65536 possible different codes, where as for an 8 bit code, there are only 256 possible different codes). That is, even though each UE may have a different UE-RNTI, the code generated at the UE following the receipt of an M-PDCCH at both the intended UE and another UE (this becomes the false alarm UE) may be the same. Such a scenario may also occur if two UEs use the same RNTI, for example. In this case, the retransmission of the M-PDCCH helps to overcome this problem (because it is very unlikely that, the same false alarm UE will have the same code as the intended UE for two separated M-PDCCH transmissions with different codes).

It is also noted that the base station may be aware of which UEs are active in the cell. In this case, the base station knows which UE-RNTIs are active in the cell and knows for each subframe whether transmitting an M-PDCCH in that subframe using a certain UE-RNTI will cause a collision in that subframe (due to the code values of two UEs being the same at that subframe). If the base station determines that use of a certain UE-RNTI will cause a collision with another UE in a certain subframe, it can defer scheduling that UE until a subframe when it knows that a collision will not occur. This mode of scheduling helps to further reduce the chance of error scenarios from occurring.

Features of the present technique can be generally described in the following numbered clauses:

1. A terminal device for use in a wireless telecommunications system, the terminal device comprising;
   a receiver;
   a transmitter; and
   a controller; wherein
   the receiver is operable to receive a first control message from a base station, the first control message indicating a radio resource for use by at least one of the receiver and transmitter to exchange a signal with the base station and the first control message comprising a code generated on the basis of an identifier of an intended terminal device and a value of a time-dependent parameter at a transmission time of the first control message, the intended terminal device being a terminal device intended for exchanging the signal with the base station; and
   the controller is operable to:
   attempt to perform a predetermined process using the code of the first control message, an identifier of the terminal device and the value of the time-dependant parameter at the transmission time of the first control message; wherein:
   if the predetermined process is not successfully completed, disregard the first control message;
   if the predetermined process is successfully completed, control at least one of the receiver and transmitter to exchange a signal with the base station using the radio resource indicated by the first control message.

2. A terminal device according to clause 1, wherein the controller is operable to:
   control the receiver to receive a signal from the base station using the radio resource indicated by the first control message, the received signal being scrambled by the base station using the identifier of the intended terminal device, and attempt to perform a descrambling process on the received signal using the identifier of the terminal device, the descrambling process being successfully completed if the identifier of the terminal device is the identifier of the intended terminal device, wherein if the descrambling process is successfully completed, then the controller is operable to control the receiver to transmit an acknowledgement message to the base station, and if the descrambling process is not successfully completed, then the controller is operable to control the receiver to transmit a non-acknowledgement message to the base station.

3. A terminal device according to either one of clauses 1 or 2, wherein the controller is operable to:
   control the transmitter to transmit a signal to the base station using the radio resource indicated by the first control message, wherein the controller is operable to perform a scrambling process on the signal to be transmitted using the identifier of the terminal device; and determine whether a readable non-acknowledgement message has been received at the receiver from the base station, wherein:

if a readable non-acknowledgement message is not received from the base station, then the controller determines that the signal has been successfully transmitted to the base station; and if a readable non-acknowledge is received from the base station, then the controller determines that the signal has not been successfully transmitted to the base station and controls the transmitter to re-transmit the signal to the base station.

4. A terminal device according to clause 3, wherein:

the receiver is operable to receive a non-acknowledgement message from the base station as part of a second control message from the base station, the second control message indicating a radio resource for use by the transmitter in re-transmitting the signal to the base station and the second control message comprising a code generated using the identifier of the intended terminal device and a value of the time-dependent parameter at the transmission time of the second control message, the value of the time-dependent parameter at the transmission time of the second control message being different to the value of the time-dependent parameter at the transmission time of the first control message so that the code of the second control message is different to the code of the first control message, and the controller is operable to:

attempt to perform the predetermined process using the code of the second control message, the identifier of the terminal device and the value of the time-dependant parameter at the transmission time of the second control message, wherein:

if the predetermined process is not successfully completed, then the controller is not able to read the received non-acknowledgement message and the controller determines that the received non-acknowledgement message is not readable; and if the predetermined process is successfully completed, then the controller is able to read the received non-acknowledgement message and the controller determines that the received non-acknowledgement message is readable.

5. A terminal device according to any preceding clause, wherein:

the identifier of the intended terminal device is a Radio Network Temporary Identifier (RNTI) of the intended terminal device;

the value of the time-dependent parameter at the transmission time of the first control message comprises a system frame number (SFN) of the first control message and a subframe number of the first control message.

6. A terminal device according to clause 5, wherein:

the first control message comprises a downlink control information (DCI) message for indicating the radio resource, and the code of the first control message is appended to the DCI message, the code comprising a cyclic redundancy code (CRC) generated on the basis of the DCI message which has been XOR-ed with a hash generated on the basis of the RNTI of the intended terminal device, the SFN of the first control message and the subframe number of the first control message; and the predetermined process attempted using the code comprises:

generating a hash on the basis of an RNTI of the terminal device, the SFN of the first control message and the subframe number of the first control message;

XOR-ing the previously XOR-ed CRC with the generated hash; and attempting a decode operation on the CRC, wherein if the decode operation of the CRC is successful, then the predetermined process is determined to have been successfully completed; and if the decode operation of the CRC is not successful, then the predetermined process is determined not to have been successfully completed.

7. A terminal device according to clause 6, wherein:

the hash generated on the basis of the RNTI of the intended terminal device, the SFN of the first control message and the subframe number of the first control message is generated by cyclically shifting a portion of the bits representing the RNTI of the intended terminal device by the SFN and subframe number; and the hash generated on the basis of the RNTI of the terminal device, the SFN of the first control message and the subframe number of the first control message is generated by cyclically shifting a portion of the bits representing the RNTI of the terminal device by the SFN and subframe number.

8. A terminal device according to clause 5, wherein:

the first control message comprises a downlink control information (DCI) message for indicating the radio resource, and the code of the first control message is appended to the DCI message, the code comprising a cyclic redundancy code (CRC) generated on the basis of a concatenated bit stream comprising the DCI message, the SFN of the first control message, the subframe number of the first control message and the RNTI of the intended terminal device; and the predetermined process attempted using the code comprises:

generating a concatenated a bit stream comprising the DCI message, the SFN of the first control message, the subframe number of the first control message and an RNTI of the terminal device;

calculating a CRC on the basis of the generated concatenated bit stream;

comparing the calculated CRC with the CRC appended to the received DCI message;

if the calculated CRC and the CRC appended to the received DCI message match, then the predetermined process is determined to have been successfully completed, and if the calculated CRC and the CRC appended to the received DCI message do not match, then the predetermined process is determined not to have been successfully completed.

9. A terminal device according to clause 5, wherein:

the first control message comprises a downlink control information (DCI) message for indicating the radio resource, and the code of the first control message is appended to the DCI message, the code comprising a hash generated on the basis of the RNTI of the intended terminal device, the SFN of the first control message, the subframe number of the first control message and a cyclic redundancy code (CRC) generated on the basis of the DCI message; and the predetermined process attempted using the code comprises:

calculating a CRC on the basis of the received DCI message;

generating a hash on the basis of an RNTI of the terminal device, the SFN of the first control message, the subframe number of the first control message and the generated CRC;

comparing the generated hash with the hash appended to the received DCI message;

if the generated hash and the hash appended to the received DCI message match, then the predetermined process is determined to have been successfully completed; and if the generated hash and the hash appended to the received DCI message do not match, then the predetermined process is determined not to have been successfully completed.

10. A terminal device according to any one of clauses 5 to 9, wherein the first control message is repeatedly received a plurality of times and the SFN and subframe number of the first control message are determined to be the SFN and subframe number of the first repetition of the first control message.

11. A terminal device according to any one of clauses 5 to 9, wherein the first control message is repeatedly received a plurality of times and the SFN and subframe number of the first control message are determined to be the SFN and subframe number of the final repetition of the first control message.

12. A terminal device according to any preceding clause, wherein the code of the first control message has a shorter bit length than the identifier of the intended terminal device.

13. A terminal device according to any one of clauses 6 to 9, wherein the RNTI of each of the intended terminal device and the terminal device has a bit length of 16 bits and the code appended to the DCI message has a bit length of 8 bits.

14. A terminal device according to clause 4, wherein:

the identifier of the intended terminal device is a Radio Network Temporary Identifier (RNTI) of the intended terminal device;

the value of the time-dependent parameter at the transmission time of the second control message comprises a system frame number (SFN) of the second control message and a subframe number of the second control message.

15. A terminal device according to clause 14, wherein:

the second control message comprises a downlink control information (DCI) message for indicating the radio resource, and the code of the second control message is appended to the DCI message, the code comprising a cyclic redundancy code (CRC) generated on the basis of the DCI message which has been XOR-ed with a hash generated on the basis of the RNTI of the intended terminal device, the SFN of the second control message and the subframe number of the second control message; and the predetermined process attempted using the code comprises:

generating a hash on the basis of an RNTI of the terminal device, the SFN of the second control message and the subframe number of the second control message;

XOR-ing the previously XOR-ed CRC with the generated hash; and attempting a decode operation on the CRC, wherein if the decode operation of the CRC is successful, then the predetermined process is determined to have been successfully completed; and if the decode operation of the CRC is not successful, then the predetermined process is determined not to have been successfully completed.

16. A terminal device according to clause 15, wherein:

the hash generated on the basis of the RNTI of the intended terminal device, the SFN of the second control message and the subframe number of the second control message is generated by cyclically shifting a portion of the bits representing the RNTI of the intended terminal device by the SFN and subframe number; and the hash generated on the basis of the RNTI of the terminal device, the SFN of the second control message and the subframe number of the second control message is generated by cyclically shifting a portion of the bits representing the RNTI of the terminal device by the SFN and subframe number.

17. A terminal device according to clause 14, wherein:

the second control message comprises a downlink control information (DCI) message for indicating the radio resource, and the code of the second control message is appended to the DCI message, the code comprising a cyclic redundancy code (CRC) generated on the basis of a concatenated bit stream comprising the DCI message, the SFN of the second control message, the subframe number of the second control message and the RNTI of the intended terminal device; and the predetermined process attempted using the code comprises:

generating a concatenated a bit stream comprising the DCI message, the SFN of the second control message, the subframe number of the second control message and an RNTI of the terminal device;

calculating a CRC on the basis of the generated concatenated bit stream;

comparing the calculated CRC with the CRC appended to the received DCI message;

if the calculated CRC and the CRC appended to the received DCI message match, then the predetermined process is determined to have been successfully completed, and if the calculated CRC and the CRC appended to the received DCI message do not match, then the predetermined process is determined not to have been successfully completed.

18. A terminal device according to clause 14, wherein:

the second control message comprises a downlink control information (DCI) message for indicating the radio resource, and the code of the second control message is appended to the DCI message, the code comprising a hash generated on the basis of the RNTI of the intended terminal device, the SFN of the second control message, the subframe number of the second control message and a cyclic redundancy code (CRC) generated on the basis of the DCI message; and the predetermined process attempted using the code comprises:

calculating a CRC on the basis of the received DCI message;

generating a hash on the basis of an RNTI of the terminal device, the SFN of the second control message, the subframe number of the second control message and the generated CRC;

comparing the generated hash with the hash appended to the received DCI message;
if the generated hash and the hash appended to the received DCI message match, then the predetermined process is determined to have been successfully completed; and
if the generated hash and the hash appended to the received DCI message do not match, then the predetermined process is determined not to have been successfully completed.

19. A terminal device according to any one of clauses 14 to 18, wherein the second control message is repeatedly received a plurality of times and the SFN and subframe number of the second control message are determined to be the SFN and subframe number of the first repetition of the second control message.

20. A terminal device according to any one of clauses 14 to 18, wherein the second control message is repeatedly received a plurality of times and the SFN and subframe number of the second control message are determined to be the SFN and subframe number of the final repetition of the second control message.

21. A terminal device according to clause 4, wherein the code of the second control message has a shorter bit length than the identifier of the intended terminal device.

22. A terminal device according to any one of clauses 15 to 18, wherein the RNTI of each of the intended terminal device and the terminal device has a bit length of 16 bits and the code appended to the DCI message has a bit length of 8 bits.

23. A base station for use in a wireless telecommunications system, the base station comprising:
a receiver;
a transmitter; and
a controller; wherein
the transmitter is operable to transmit a first control message to a plurality of terminal devices, the first control message indicating a radio resource for use by at least one of the receiver and transmitter to exchange a signal with an intended terminal device of the plurality of terminal devices and the first control message comprising a code generated using an identifier of the intended terminal device and a value of a time-dependent parameter at a transmission time of the first control message, the intended terminal device being a terminal device intended for exchanging the signal with the base station; and
control at least one of the receiver and transmitter to exchange a signal with the intended terminal device using the radio resource indicated by the first control message.

24. A base station according to clause 23, wherein the controller is operable to:
control the transmitter to transmit a signal to the plurality of terminal devices using the radio resource indicated by the first control message, wherein the controller is operable to scramble the signal to be transmitted using the identifier of the intended terminal device, and control the receiver to receive at least one of an acknowledgement message from the intended terminal device, a non-acknowledgement message from the intended terminal device and a non-acknowledgement message from a different terminal device of the plurality of terminal devices, wherein:
if an acknowledgement message is received and no non-acknowledgement message is received, then the controller determines the signal to have been successfully received and descrambled by the intended terminal device, and
if a non-acknowledgement message is received, then the controller is operable to control the transmitter to transmit a second control message to the plurality of terminal devices, the second control message indicating a radio resource for use by the transmitter to re-transmit the signal to the intended terminal device and the second control message comprising a code generated using the identifier of the intended terminal device and a value of the time-dependent parameter at the transmission time of the second control message, the value of the time-dependent parameter at the transmission time of the second control message being different to the value of the time-dependent parameter at the transmission time of the first control message so that the code of the second control message is different to the code of the first control message, and to re-transmit the signal to the plurality of terminal devices using the radio resource indicated by the second control message, wherein the controller is operable to scramble the signal to be transmitted using the identifier of the intended terminal device.

25. A base station according to clause 23, wherein the controller is operable to:
control the receiver to receive a signal from at least one of the intended terminal device and a different terminal device of the plurality of terminal devices, each received signal being transmitted by the intended terminal device or the different terminal device using the radio resource indicated by the first control message, and each received signal being scrambled according to an identifier of the one of the intended terminal device and different terminal device from which it is transmitted, and attempt to perform a descrambling process on each received signal using the identifier of the intended terminal device, the descrambling process being successfully completed for a received signal if the received signal has been scrambled according to the identifier of the intended terminal device, wherein:
if the descrambling process is not successfully completed for each received signal, then the controller is operable to control the transmitter to transmit a non-acknowledgement message to the plurality of terminal devices indicating that the descrambling process has not been successfully completed, the non-acknowledgement message being transmitted as part of a second control message, the second control message indicating a radio resource for use by the receiver to re-receive the signal from the intended terminal device and the second control message comprising a code generated using the identifier of the intended terminal device and a value of the time-dependent parameter at the transmission time of the second control message, the value of the time-dependent parameter at the transmission time of the second control message being different to the value of the time-dependent parameter at the transmission time of the first control message so that the code of the second control message is different to the code of the first control message.

26. A base station according to clause 23, wherein:
the controller is operable to:
determine an identifier of each terminal device in the plurality of terminal devices;
generate a candidate code of the first control message using the identifier of the intended terminal device and a value of the time-dependent parameter at a first potential transmission time of the first control message;

determine whether the candidate code of the first control message will be generated using an identifier of another terminal device of the plurality of terminal devices and the value of the time-dependent parameter at the first potential transmission time of the first control message;

if it is determined that the candidate code of the first control message will not be generated using an identifier of another terminal device of the plurality of terminal devices and the value of the time-dependent parameter at the first potential transmission time of the first control message, control the transmitter to transmit the first control message at the first potential transmission time with the candidate code as the code of the first control message; and if it is determined that the candidate code of the potential first control message will be generated using an identifier of another terminal device of the plurality of terminal devices and the value of the time-dependent parameter at the first potential transmission time of the first control message, control the transmitter to transmit the first control message at a different transmission time with a code generated using the identifier of the intended terminal device and a value of the time-dependent parameter at the different transmission time of the first control message.

27. A system comprising a terminal device according to clause 1 and a base station according to clause 23.

28. A method of operating a terminal device for use in a wireless telecommunications system, the terminal device comprising a receiver and a transmitter, wherein the method comprises:

controlling the receiver to receive a first control message from a base station, the first control message indicating a radio resource for use by at least one of the receiver and transmitter to exchange a signal with the base station and the first control message comprising a code generated on the basis of an identifier of an intended terminal device and a value of a time-dependent parameter at a transmission time of the first control message, the intended terminal device being a terminal device intended for exchanging the signal with the base station;

attempting to perform a predetermined process using the code of the first control message, an identifier of the terminal device and the value of the time-dependant parameter at the transmission time of the first control message;

if the predetermined process is not successfully completed, disregarding the first control message; and if the predetermined process is successfully completed, controlling at least one of the receiver and transmitter to exchange a signal with the base station using the radio resource indicated by the first control message.

29. A method of operating a base station for use in a wireless telecommunications system, the base station comprising a receiver and transmitter, wherein the method comprises:

controlling the transmitter to transmit a first control message to a plurality of terminal devices, the first control message indicating a radio resource for use by at least one of the receiver and transmitter to exchange a signal with an intended terminal device of the plurality of terminal devices and the first control message comprising a code generated using an identifier of the intended terminal device and a value of a time-dependent parameter at a transmission time of the first control message, the intended terminal device being a terminal device intended for exchanging the signal with the base station; and controlling at least one of the receiver and transmitter to exchange a signal with the intended terminal device using the radio resource indicated by the first control message.

30. A terminal device for use in a wireless telecommunications system, the terminal device comprising;

receiver circuitry;

transmitter circuitry; and controller circuitry; wherein the receiver circuitry is operable to receive a first control message from a base station, the first control message indicating a radio resource for use by at least one of the receiver circuitry and transmitter circuitry to exchange a signal with the base station and the first control message comprising a code generated on the basis of an identifier of an intended terminal device and a value of a time-dependent parameter at a transmission time of the first control message, the intended terminal device being a terminal device intended for exchanging the signal with the base station; and the controller circuitry is operable to:

attempt to perform a predetermined process using the code of the first control message, an identifier of the terminal device and the value of the time-dependant parameter at the transmission time of the first control message; wherein:

if the predetermined process is not successfully completed, disregard the first control message;

if the predetermined process is successfully completed, control at least one of the receiver circuitry and transmitter circuitry to exchange a signal with the base station using the radio resource indicated by the first control message.

31. A base station for use in a wireless telecommunications system, the base station comprising:

receiver circuitry;

transmitter circuitry; and controller circuitry; wherein the transmitter circuitry is operable to transmit a first control message to a plurality of terminal devices, the first control message indicating a radio resource for use by at least one of the receiver circuitry and transmitter circuitry to exchange a signal with an intended terminal device of the plurality of terminal devices and the first control message comprising a code generated using an identifier of the intended terminal device and a value of a time-dependent parameter at a transmission time of the first control message, the intended terminal device being a terminal device intended for exchanging the signal with the base station; and control at least one of the receiver circuitry and transmitter circuitry to exchange a signal with the intended terminal device using the radio resource indicated by the first control message.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink communications channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an base station to UEs being served by the base station. For example, a number of resource blocks of the PDSCH may be allocated to a UE in order that it may receive data that it has previously requested or data which is being pushed to it by the base station, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the base station for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the base station. Further information on the structure and functioning of the physical channels of LTE systems can be found in [1].

In an analogous manner to the resources of the PDSCH, resources of the PUSCH are required to be scheduled or granted by the serving base station and thus if data is to be transmitted by a UE, resources of the PUSCH are required to be granted to the UE by the base station. At a UE, PUSCH resource allocation is achieved by the transmission of a scheduling request or a buffer status report to its serving base station. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the base station is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the base station and gives the base station information regarding the amount of data in an uplink buffer or buffers at the UE. After receiving the buffer status report, the base station can allocate a portion of the PUSCH resources to the sending UE in order to transmit some of its buffered uplink data and then inform the UE of the resource allocation via a DCI in the PDCCH. For example, presuming a UE has a connection with the base station, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating base station, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an base station is required if UEs, even when in close proximity, wish to communicate with one another. These limitations may be problematic when the system is experiencing high load or base station coverage is not available, for instance in remote areas or when base stations are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.

The invention claimed is:

1. A terminal device for use in a wireless telecommunications system, the terminal device comprising:
   a receiver;
   a transmitter; and
   processing circuitry; wherein
   the receiver is configured to:
      receive a first control message from a base station, the first control message indicating a radio resource for use by at least one of the receiver and transmitter to exchange a signal with the base station and the first control message comprising a code generated on the basis of an identifier of an intended terminal device and a value of a time-dependent parameter at a transmission time of the first control message, the intended terminal device being a terminal device intended for exchanging the signal with the base station; and
      receive a non-acknowledgement message from the base station as part of a second control message from the base station, the second control message indicating a radio resource for use by the transmitter in re-transmitting the signal to the base station and the second control message comprising a code generated using the identifier of the intended terminal device and a value of the time-dependent parameter at a transmission time of the second control message, the value of the time-dependent parameter at the transmission time of the second control message being different to the value of the time dependent parameter at the transmission time of the first control message so that the code of the second control message is different to the code of the first control message, and
   the processing circuitry is configured to:
      attempt to perform a predetermined process using the code of the first control message, an identifier of the terminal device and the value of the time-dependant parameter at the transmission time of the first control message;
      if the predetermined process using the code of the first control message is not successfully completed, disregard the first control message;
      if the predetermined process using the code of the first control message is successfully completed, control at least one of the receiver and transmitter to exchange a signal with the base station using the radio resource indicated by the first control message;
      attempt to perform the predetermined process using the code of the second control message, the identifier of the terminal device and the value of the time-dependant parameter at the transmission time of the second control message;
      if the predetermined process using the code of the second control message is not successfully completed, determine that the received non-acknowledgement message is not readable; and
      if the predetermined process using the code of the second control message is successfully completed, determine that the received non-acknowledgement message is readable.

2. The terminal device according to claim 1, wherein the processing circuitry is configured to:
   control the receiver to receive a signal from the base station using the radio resource indicated by the first control message, the received signal being scrambled by the base station using the identifier of the intended terminal device, and attempt to perform a descrambling process on the received signal using the identifier of the terminal device, the descrambling process being successfully completed if the identifier of the terminal device is the identifier of the intended terminal device, wherein if the descrambling process is successfully completed, then the processing circuitry is configured to control the receiver to transmit an acknowledgement message to the base station, and if the descrambling process is not successfully completed, then the processing circuitry is configured to control the receiver to transmit a non-acknowledgement message to the base station.

3. The terminal device according to claim 1, wherein the processing circuitry is configured to:
   control the transmitter to transmit a signal to the base station using the radio resource indicated by the first control message, wherein the processing circuitry is configured to perform a scrambling process on the signal to be transmitted using the identifier of the terminal device; and determine whether a readable non-acknowledgement message has been received at the receiver from the base station, wherein:

if a readable non-acknowledgement message is not received from the base station, then the processing circuitry determines that the signal has been successfully transmitted to the base station; and if a readable non-acknowledge is received from the base station, then the processing circuitry determines that the signal has not been successfully transmitted to the base station and controls the transmitter to re-transmit the signal to the base station.

4. The terminal device according to claim 1, wherein
the identifier of the intended terminal device is a Radio Network Temporary Identifier (RNTI) of the intended terminal device, and the value of the time-dependent parameter at the transmission time of the first control message comprises a system frame number (SFN) of the first control message and a subframe number of the first control message.

5. The terminal device according to claim 4, wherein the first control message is repeatedly received a plurality of times and the SFN and subframe number of the first control message are determined to be the SFN and subframe number of a first repetition of the first control message.

6. The terminal device according to claim 4, wherein the first control message is repeatedly received a plurality of times and the SFN and subframe number of the first control message are determined to be the SFN and subframe number of a final repetition of the first control message.

7. The terminal device according to claim 1, wherein the code of the first control message has a shorter bit length than the identifier of the intended terminal device.

8. The terminal device according to claim 1, wherein
the identifier of the intended terminal device is a Radio Network Temporary Identifier (RNTI) of the intended terminal device, and the value of the time-dependent parameter at the transmission time of the second control message comprises a system frame number (SFN) of the second control message and a subframe number of the second control message.

9. The terminal device according to claim 8, wherein
the second control message comprises a downlink control information (DCI) message for indicating the radio resource, and the code of the second control message is appended to the DCI message, the code comprising a cyclic redundancy code (CRC) generated on the basis of the DCI message which has been XOR-ed with a hash generated on the basis of the RNTI of the intended terminal device, the SFN of the second control message and the subframe number of the second control message, and the predetermined process attempted using the code comprises:

generating a hash on the basis of an RNTI of the terminal device, the SFN of the second control message and the subframe number of the second control message;

XOR-ing the previously XOR-ed CRC with the generated hash; and attempting a decode operation on the CRC, wherein if the decode operation of the CRC is successful, then the predetermined process is determined to have been successfully completed, and if the decode operation of the CRC is not successful, then the predetermined process is determined not to have been successfully completed.

10. The terminal device according to claim 9, wherein
the hash generated on the basis of the RNTI of the intended terminal device, the SFN of the second control message and the subframe number of the second control message is generated by cyclically shifting a portion of bits representing the RNTI of the intended terminal device by the SFN and subframe number, and the hash generated on the basis of the RNTI of the terminal device, the SFN of the second control message and the subframe number of the second control message is generated by cyclically shifting a portion of bits representing the RNTI of the terminal device by the SFN and subframe number.

11. The terminal device according to claim 9, wherein the RNTI of each of the intended terminal device and the terminal device has a bit length of 16 bits and the code appended to the DCI message has a bit length of 8 bits.

12. The terminal device according to claim 8, wherein
the second control message comprises a downlink control information (DCI) message for indicating the radio resource, and the code of the second control message is appended to the DCI message, the code comprising a cyclic redundancy code (CRC) generated on the basis of a concatenated bit stream comprising the DCI message, the SFN of the second control message, the subframe number of the second control message and the RNTI of the intended terminal device, the predetermined process attempted using the code comprises:

generating a concatenated a bit stream comprising the DCI message, the SFN of the second control message, the subframe number of the second control message and an RNTI of the terminal device;

calculating a CRC on the basis of the generated concatenated bit stream; and comparing the calculated CRC with the CRC appended to the DCI message, if the calculated CRC and the CRC appended to the DCI message match, then the predetermined process is determined to have been successfully completed, and if the calculated CRC and the CRC appended to the DCI message do not match, then the predetermined process is determined not to have been successfully completed.

13. The terminal device according to claim 8, wherein
the second control message comprises a downlink control information (DCI) message for indicating the radio resource, and the code of the second control message is appended to the DCI message, the code comprising a hash generated on the basis of the RNTI of the intended terminal device, the SFN of the second control message, the subframe number of the second control message and a cyclic redundancy code (CRC) generated on the basis of the DCI message, the predetermined process attempted using the code comprises:

calculating a CRC on the basis of the DCI message;

generating a hash on the basis of an RNTI of the terminal device, the SFN of the second control message, the subframe number of the second control message and the generated CRC; and comparing the generated hash with the hash appended to the DCI message,
if the generated hash and the hash appended to the DCI message match, then the predetermined process is determined to have been successfully completed, and
if the generated hash and the hash appended to the DCI message do not match, then the predetermined process is determined not to have been successfully completed.

14. The terminal device according to claim 8, wherein the second control message is repeatedly received a plurality of times and the SFN and subframe number of the second control message are determined to be the SFN and subframe number of a first repetition of the second control message.

15. The terminal device according to claim 8, wherein the second control message is repeatedly received a plurality of times and the SFN and subframe number of the second control message are determined to be the SFN and subframe number of a final repetition of the second control message.

16. The terminal device according to claim 1, wherein the code of the second control message has a shorter bit length than the identifier of the intended terminal device.

17. A terminal device for use in a wireless telecommunications system, the terminal device comprising:
a receiver;
a transmitter; and
processing circuitry, wherein
the receiver is configured to:
receive a first control message from a base station, the first control message indicating a radio resource for use by at least one of the receiver and transmitter to exchange a signal with the base station and the first control message comprising a code generated on the basis of an identifier of an intended terminal device and a value of a time-dependent parameter at a transmission time of the first control message, the intended terminal device being a terminal device intended for exchanging the signal with the base station;
the processing circuitry is configured to:
attempt to perform a predetermined process using the code of the first control message, an identifier of the terminal device and the value of the time-dependant parameter at the transmission time of the first control message,
the first control message comprises a downlink control information (DCI) message for indicating the radio resource, and the code of the first control message is appended to the DCI message, the code comprising a cyclic redundancy code (CRC) generated on the basis of the DCI message which has been XOR-ed with a hash generated on the basis of the identifier of the intended terminal device and the value of the time-dependent parameter at the transmission time of the first control message,
the predetermined process attempted using the code comprises:
generating a hash on the basis of the identifier of the terminal device and the value of the time-dependent parameter at the transmission time of the first control message;
XOR-ing the previously XOR-ed CRC with the generated hash; and
attempting a decode operation on the CRC, and
the processing circuitry is further configured to:
if the decode operation of the CRC is successful, determine the predetermined process to have been successfully completed;
if the decode operation of the CRC is not successful, determine the predetermined process not to have been successfully completed;
if the predetermined process is determined not to have been successfully completed, disregard the first control message; and
if the predetermined process is determined to have been successfully completed, control at least one of the receiver and transmitter to exchange a signal with the base station using the radio resource indicated by the first control message.

18. The terminal device according to claim 17, wherein
the identifier of the intended terminal device is a Radio Network Temporary Identifier (RNTI) of the intended terminal device,
the value of the time-dependent parameter at the transmission time of the first control message comprises a system frame number (SFN) of the first control message and a subframe number of the first control message,
the DCI has been XOR-ed with the hash generated on the basis of the RNTI of the intended terminal device, the SFN of the first control message and the subframe number of the first control message, and
the generating of the hash included in the predetermined process attempted using the code comprises is on the basis of an RNTI of the terminal device, the SFN of the first control message and the subframe number of the first control message.

19. The terminal device according to claim 18, wherein
the hash generated on the basis of the RNTI of the intended terminal device, the SFN of the first control message and the subframe number of the first control message is generated by cyclically shifting a portion of bits representing the RNTI of the intended terminal device by the SFN and subframe number, and
the hash generated on the basis of the RNTI of the terminal device, the SFN of the first control message and the subframe number of the first control message is generated by cyclically shifting a portion of the bits representing the RNTI of the terminal device by the SFN and subframe number.

20. The terminal device according to claim 18, wherein the RNTI of each of the intended terminal device and the terminal device has a bit length of 16 bits and the code appended to the DCI message has a bit length of 8 bits.

21. A terminal device for use in a wireless telecommunications system, the terminal device comprising:
a receiver;
a transmitter; and
processing circuitry, wherein
the receiver is configured to:
receive a first control message from a base station, the first control message indicating a radio resource for use by at least one of the receiver and transmitter to exchange a signal with the base station and the first control message comprising a code generated on the basis of an identifier of an intended terminal device and a value of a time-dependent parameter at a transmission time of the first control message, the intended terminal device being a terminal device intended for exchanging the signal with the base station;
the processing circuitry is configured to:
attempt to perform a predetermined process using the code of the first control message, an identifier of the terminal device and the value of the time-dependant parameter at the transmission time of the first control message, the first control message comprises a downlink control information (DCI) message for indicating the radio resource, and the code of the first control message is appended to the DCI message, the code comprising a cyclic redundancy code (CRC) generated on the basis of a concatenated bit stream comprising the DCI message, the value of the time-dependent parameter at the transmission time of the first control message and the identifier of the intended terminal device, the predetermined process attempted using the code comprises:
 generating a concatenated bit stream comprising the DCI message, the value of the time-dependent parameter at the transmission time of the first control message and the identifier of the terminal device;
 calculating a CRC on the basis of the generated concatenated bit stream; and
 comparing the calculated CRC with the CRC appended to the DCI message, and the processing circuitry is further configured to:
 if the calculated CRC and the CRC appended to the DCI message match, determine the predetermined process to have been successfully completed;
 if the calculated CRC and the CRC appended to the DCI message do not match, determine the predetermined process not to have been successfully completed;
 if the predetermined process is determined not to have been successfully completed, disregard the first control message; and
 if the predetermined process is determined to have been successfully completed, control at least one of the receiver and transmitter to exchange a signal with the base station using the radio resource indicated by the first control message.

22. The terminal device according to claim 21, wherein the identifier of the intended terminal device is a Radio Network Temporary Identifier (RNTI) of the intended terminal device, the value of the time-dependent parameter at the transmission time of the first control message comprises a system frame number (SFN) of the first control message and a subframe number of the first control message, the code of the first control message comprises the CRC generated on the basis of the concatenated bit stream comprising the DCI message, the SFN of the first control message, the subframe number and the RNTI of the intended terminal device, and the generated concatenated bit stream comprises the DCI message, the SFN of the first control message, the subframe number of the first control message and an RNTI of the terminal device.

23. A terminal device for use in a wireless telecommunications system, the terminal device comprising:
 a receiver;
 a transmitter; and
 processing circuitry, wherein
 the receiver is configured to:
  receive a first control message from a base station, the first control message indicating a radio resource for use by at least one of the receiver and transmitter to exchange a signal with the base station and the first control message comprising a code generated on the basis of an identifier of an intended terminal device and a value of a time-dependent parameter at a transmission time of the first control message, the intended terminal device being a terminal device intended for exchanging the signal with the base station;

the processing circuitry is configured to:
attempt to perform a predetermined process using the code of the first control message, an identifier of the terminal device and the value of the time-dependant parameter at the transmission time of the first control message, the first control message comprises a downlink control information (DCI) message for indicating the radio resource, and the code of the first control message is appended to the DCI message, the code comprising a hash generated on the basis of the identifier of the intended terminal device, the value of the time-dependent parameter at the transmission time of the first control message and a cyclic redundancy code (CRC) generated on the basis of the DCI message, the predetermined process attempted using the code comprises:
 calculating a CRC on the basis of the DCI message;
 generating a hash on the basis of the identifier of the terminal device, the value of the time-dependent parameter at the transmission time of the first control message and the generated CRC; and
 comparing the generated hash with the hash appended to the DCI message, and the processing circuitry is further configured to:
 if the generated hash and the hash appended to the DCI message match, determine the predetermined process to have been successfully completed;
 if the generated hash and the hash appended to the DCI message do not match, determine the predetermined process not to have been successfully completed;
 if the predetermined process is determined not to have been successfully completed, disregard the first control message; and
 if the predetermined process is determined to have been successfully completed, control at least one of the receiver and transmitter to exchange a signal with the base station using the radio resource indicated by the first control message.

24. The terminal device according to claim 23, wherein the identifier of the intended terminal device is a Radio Network Temporary Identifier (RNTI) of the intended terminal device, the value of the time-dependent parameter at the transmission time of the first control message comprises a system frame number (SFN) of the first control message and a subframe number of the first control message, the hash included in the code of the first control message is generated on the basis of the RNTI of the intended terminal device, the SFN of the first control message, the subframe number of the first control message and the CRC generated on the basis of the DCI message, and the generating of the hash included in the predetermined process attempted using the code is on the basis of an RNTI of the terminal device, the SFN of the first control message, the subframe number of the first control message and the generated CRC.

* * * * *